United States Patent
Adams et al.

(10) Patent No.: US 11,685,810 B2
(45) Date of Patent: Jun. 27, 2023

(54) PROCESS FOR POLYMERIZING BETA-BUTYROLACTONE

(71) Applicant: Technische Universität München, Munich (DE)

(72) Inventors: Friederike Adams, Munich (DE); Bernhard Rieger, Oberelchingen (DE)

(73) Assignee: Technische Universität München, Munich (DE)

( * ) Notice: Subject to any disclaimer, the term of this patent is extended or adjusted under 35 U.S.C. 154(b) by 0 days.

(21) Appl. No.: 17/829,490

(22) Filed: Jun. 1, 2022

(65) Prior Publication Data

US 2022/0389157 A1   Dec. 8, 2022

Related U.S. Application Data

(62) Division of application No. 16/954,684, filed as application No. PCT/EP2018/082120 on Nov. 21, 2018, now Pat. No. 11,459,423.

(30) Foreign Application Priority Data

Dec. 23, 2017  (EP) .................................... 17210556

(51) Int. Cl.
C08G 63/84    (2006.01)
C07F 5/00     (2006.01)
C08G 63/08    (2006.01)

(52) U.S. Cl.
CPC .............. *C08G 63/84* (2013.01); *C07F 5/003* (2013.01); *C08G 63/08* (2013.01)

(58) Field of Classification Search
CPC .......... C07F 5/003; C08G 63/08; C08G 63/84
See application file for complete search history.

(56) References Cited

U.S. PATENT DOCUMENTS

2022/0389157 A1* 12/2022 Adams ................ C07F 5/003

FOREIGN PATENT DOCUMENTS

EP    3502161      6/2019
EP    3502161 A1 * 6/2019  .............. C07F 5/003

OTHER PUBLICATIONS

International Search Report and Written Opinion dated Jun. 27, 2019 by the International Searching Authority for International Application No. PCT/EP2018/082120, filed on Nov. 21, 2018 and published as WO2019120846 on Jun. 27, 2019 (Technische Universität München) (9 Pages).
Kodama H et al: "Lanthanide-catalyzed asymmetric 1,3-dipolar cycloaddition of nitrones to alkenes using 3,3'-bis(2-oxazolyl)-1,1'-bi-2-naphthol (BINOL-Box) ligands", Journal of Organometallic Chemis, Elsevier-Sequoia S.A. Lausanne, CH, vol. 603, No. 1, May 22, 2000 (May 22, 2000), pp. 6-12.
Manuela Zintl et al: "Variably Isotactic Poly(hydroxybutyrate) from Racemic [beta]-Butyrolactone: Microstructure Control by Achiral Chromium(III) Salophen Complexes", Angewandte Chemie International Edition, vol. 47, No. 18, Apr. 21, 2008 (Apr. 21, 2008), pp. 3458-3460.
Romain Ligny et al: "Highly Syndiotactic or Isotactic Polyhydroxyalkanoates by Ligand-Controlled Yttrium-Catalyzed Stereoselective Ring-Opening Polymerization of Functional Racemic [beta]-Lactones", Angewandte Chemie International Edition, vol. 56, No. 35, Aug. 21, 2017 (Aug. 21, 2017), pp. 10388-10393.
Zongrui Hou et al: "Highly Enantioselective Insertion of Carbenoids into N?H Bonds Catalyzed by Copper(I) Complexes of Binol Derivatives", Angewandte Chemie International Edition, vol. 49, No. 28, Jun. 28, 2010 (Jun. 28, 2010), pp. 4763-4766.
Wu et al. "Recent developments in main group metal complexes catalyzed/initiated polymerization of lactides and related cyclic esters", Coordination Chemistry Reviews 250 (2006) 602-626.
Jean-Francois Carpentier "Rare-Earth complexes supported by tripodal tetradentate bis(phenolate) ligands: a privileged class of catalysts for ring-opening polymerization of cyclic esters", Organometallics, 2015.
Abderramane Amgoune et al "Highly active, productive, and syndiospecific yttrium initiators for the polymerization of racemic b-butyrolatcone", Angew. Chem. Int. Ed., 2006, 45, 2782-2784.
Miloud Bouyahyi et al., "Exploring electronic versus steric effects in stereoselective ring-opening polymerization of lactide and b-butyrolactone with amino-alkoxybis(phenolate)-Yttrium Complexes", Chem. Eur. J. 2011, 1872-1883.

* cited by examiner

*Primary Examiner* — Frances Tischler
*Assistant Examiner* — Gennadiy Mesh
(74) *Attorney, Agent, or Firm* — Ballard Spahr LLP

(57) ABSTRACT

A catalyst/initiator system that can be used for polymerizing β-butyrolactone is described. The catalyst/initiator system includes a rare earth metal, a chiral ligand, at least one nucleophilic ligand, optionally at least one solvent ligand, and optionally an alkali based co-catalyst. The chiral ligand can have the structure of Formula A, as shown below:

Formula A

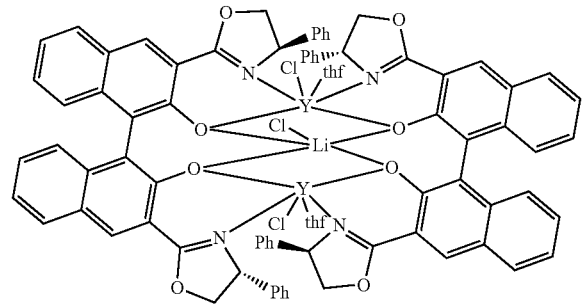

wherein Y represents rare earth metal Yttrium, Ph represents Phenyl radical and thf represents tetrahydrofuran solvent ligand.

1 Claim, 10 Drawing Sheets

PROCESS FOR POLYMERIZING BETA-BUTYROLACTONE

CROSS-REFERENCE TO RELATED APPLICATIONS

This is a divisional application of U.S. application Ser. No. 16/954,684, filed Jun. 17, 2020, which is a U.S. National Phase Application of International Application No. PCT/EP2018/082120, filed Nov. 21, 2018, which claims priority to European Application No. 17210556.1, filed Dec. 23, 2017, each of which are hereby incorporated by reference in their entirety.

The present invention is concerned with a process for polymerizing racemic β-butyrolactone to obtain polymers with high isotacticity, and with a polymer obtained with this process.

Poly(3-hydroxybutyrate) (PHB) is a biopolymer that is produced by microorganisms. In its natural form it is a strictly isotactic polyester of the monomer 3-(R)-hydroxybutyric acid. This polymer is highly valuable as it is biodegradable, is a renewable resource, has barrier properties and has convenient thermoplastic properties similar to those of polypropylene. Although natural PHB is a valuable resource, there are some properties which could be improved, in particular the thermoplastic properties, and thermostability. Moreover, it is desirable to provide a synthetic process for preparing these polymers.

It is known to produce PHB polymers by fermentation of glucose containing materials, i.e. food resources. From an ethical view it is not desirable to use food materials for the production of technical products. Moreover, using a fermentation process results in a polymer which is similar to the polymer produced by microorganisms, i.e. a highly isotactic (R)-polymer, and has the same disadvantages. Due to the high crystallinity of these polymers it is very brittle and has a melting temperature which is near the decomposition temperature which makes its processability impossible.

β-Butyrolactone as a monomer for PHB synthesis is obtainable by a synthesis method using propylene oxide and CO, i.e. readily available cheap products. However, this method yields racemic β-butyrolactone which consists of same amounts of (R)- and (S)-β-butyrolactone. It is desirable to be able to use racemic β-butyrolactone for producing isotactic PHB.

Methods have been described for the synthesis of PHB polymers via a ring opening polymerization using different catalysts. Many catalysts have been developed in the past, but most of these catalysts produce only atactic or syndiotactic PHB polymers. These syndiotactic or atactic PHB polymers have inferior properties than isotactic polymers. In particular they are not biodegradable and the thermoplastic properties are not optimal.

Thus, those PHB polymer products that are presently available are either not biodegradable or have less desirable mechanical properties.

Although, it would be possible to prepare isotactic PHB polymers by using enantiomerically pure β-butyrolactone, i.e. either only the (R)-enantiomer or only the (S)-enantiomer, this option is not feasible as the separation of enantiomers is very time and cost consuming.

Thus, it is an object of the present invention to provide a process wherein racemic β-butyrolactone can be used and nevertheless an isotactic polymer can be obtained. Moreover, it was an object of the present invention to provide a process for preparing PHB polymers that have improved mechanical properties but at the same time are biodegradable. Moreover, it was an object to provide a process for preparing a polymer with a predetermined percentage of isotacticity. It was another object of the present invention to provide a polymer that can be produced from monomers that are readily available and/or can be produced from cheap components. Furthermore, it was an object of the present invention to provide a polymer having barrier properties.

All these objects are obtained by using a process as defined in claim 1 and by polymers obtained by the processes described in this application.

A process for polymerizing β-butyrolactone with an isotacticity of at least 60% is provided which comprises contacting racemic β-butyrolactone or an enantiomer thereof with a catalyst/initiator system which comprises a rare earth metal, a chiral ligand, at least one nucleophilic ligand, optionally at least one solvent ligand, and optionally an alkali based co-catalyst, wherein the chiral ligand is an enantiomer of a unit of formula I

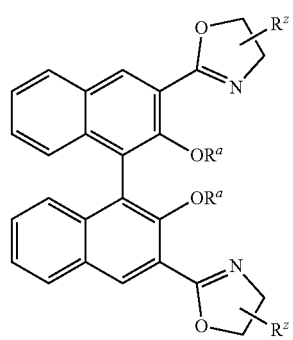

wherein each $R^z$ independently is substituted or unsubstituted linear $C_1$-$C_{20}$ alkyl, or substituted or unsubstituted branched, or cyclic $C_3$-$C_{20}$ alkyl, substituted or unsubstituted $C_6$-$C_{20}$ aryl, substituted or unsubstituted $C_5$-$C_{20}$ heteroaryl, or halogen; wherein each $R^a$ independently is H, $Me^+$, wherein $Me^+$ is alkali metal, alkaline earth metal, $(MeZ)^+$, wherein Z is a charge equalizing anion, or wherein two $R^a$ together are alkaline earth metal.

The catalyst/initiator system that is used in the method of the present invention is based on a rare earth metal and comprises a chiral ligand as essential part of the system.

The catalyst/initiator system of the present invention can be obtained on different routes, for example by first preparing a rare earth metal compound carrying at least one nucleophilic ligand and optionally at least one solvent ligand or by using a one pot reaction, with or without a co-catalyst.

In one embodiment the catalyst/initiator system is obtained by contacting a chiral ligand of formula I with a compound of formula II:

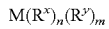

and optionally an alkali based co-catalyst,
wherein M is a rare earth metal,
each $R^x$ independently is a nucleophilic ligand,
each $R^y$ independently is a solvent ligand,
n is an integer from 1-5, such as 1-3,
m is an integer from 0-5, such as 1-3 with the proviso that n+m is an integer corresponding to the number of association/bonding sites of the rare earth metal, the upper limit of which is the number of available association/bonding sites on the rare earth metal, which is up to 9, such as 5 or 6.

In another embodiment the catalyst/initiator system is obtained by contacting a chiral ligand of formula I with a rare earth metal compound of formula III $MX_3(R^y)_m$, wherein M is a rare earth metal, $R^y$ and m are as defined above and each X independently is halogenide, triflate, or $C_1$-$C_{20}$ alkoxide, and with a solvent, and optionally an alkali based co-catalyst, For activation the obtained complex is contacted with an alkali salt of a nucleophilic ligand (co-catalyst). When contacting these components a complex is obtained which comprises a rare earth metal atom bound/associated with the chiral ligand and with at least one nucleophilic ligand and/or solvent ligand. When this route is used, the complex can also include alkali species, for example lithium or potassium halogenides.

The catalyst/initiator system can be obtained and/or used with or without a co-catalyst. The catalyst/initiator system of the present invention can be obtained by first preparing a rare earth metal compound of formula II, wherein the rare earth metal atom carries already at least one nucleophilic ligand and optionally at least one solvent ligand. It is also possible to prepare the catalyst/initiator system in a one pot reaction, with or without a co-catalyst. Furthermore, after the reaction the complete catalyst/initiator system can be isolated or the reaction mixture can be used directly. In other words, the catalyst/initiator system can be either prepared in situ, i.e. the components of the system can be added to the monomer composition and the system provides the catalytic activity directly. It is also possible to prepare the catalyst/initiator system separately, isolate it and to add it to the monomer composition.

Surprisingly it has been found that when using a catalyst/initiator system as defined in claim 1 it is possible to produce PHB polymers that have a predeterminable amount of isotacticity, a predeterminable amount of imperfections and combine mechanical strength with biodegradability. Such biodegradable polymers can be used for many purposes, for example for packaging. Moreover, it has been found that these polymers still have highly desirable barrier properties, in particular have a high oxygen barrier. By introducing imperfections the mechanical properties are improved compared to natural occurring or microbial produced PHB polymers, i.e. the polymers produced with the process of the present invention have a lower melting point, are less brittle and rigid and have a higher tensile strength.

These valuable properties are obtained by using the process of the present invention, in particular by using the catalyst/initiator system as defined in claim 1.

It has been found that a catalyst/initiator system comprising a rare earth metal based compound, a chiral ligand and optionally an alkali-based co-catalyst allows to polymerize racemic β-butyrolactone to obtain isotactic PHB with either a majority of (R)-enantiomers or a majority of (S)-enantiomers. Although a racemic mixture of monomers is used, the polymer comprises only one type of enantiomers with some imperfections. These imperfections in the polymer introduced by the catalyst/initiator system of the present invention provide for the improved mechanical properties. The amount or percentage of imperfections can be controlled in the process of the present invention by parameters as disclosed below, and it should be low enough to maintain the biodegradability which is a valuable property of the polymer.

The figures further explain the subject matter of the present invention.

FIG. 1 shows a conversion per time diagram for racemic β-butyrolactone using a catalyst/initiator system of the present invention.

FIG. 2 shows $^{13}$C-NMR-spectra which are used to determine the microstructure of the polymer obtained with a process of the present invention. For analysis it is possible to either evaluate the carbonyl signal at 169 ppm (see FIG. 2a) or the methylene signal at 40 ppm (see FIGS. 2b-d). The ratio between the isotactic part of the polymer (mm and rm) and the syndiotactic part (rr and mr) has been calculated for PHB examples in deuterated chloroform with different isotacticity ratios from 0.70 to 0.88.

FIG. 3 shows the DSC curve for a PHB example that has been obtained using the process of the present invention. It can be seen that the melting temperature $T_m$ is 166° C. and, thus, lower than the melting point of known polymers.

FIGS. 4a and 4b show $^1$H and DOSY-NMR of the compound of table 2, entry 3 indicating that only one polymer species formed and that no polymer blend with different diffusion coefficients was obtained.

Figure 1:
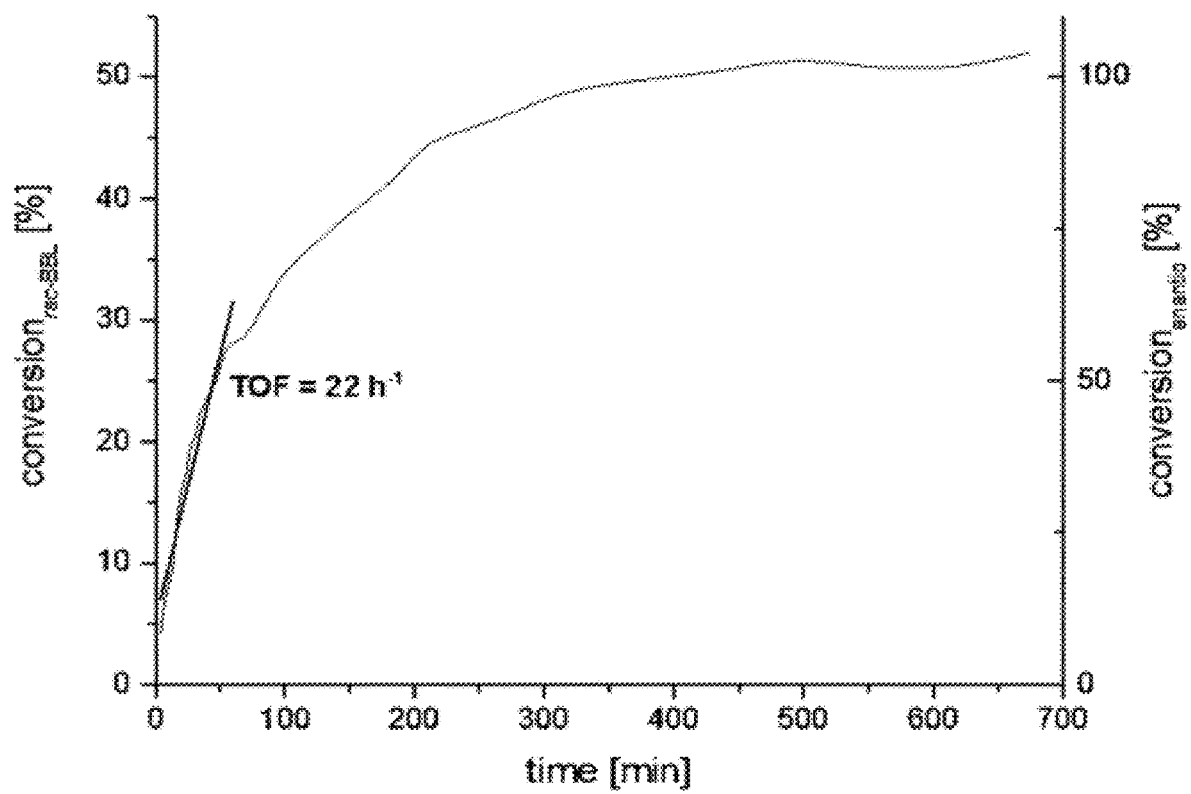

The following definitions are used in the present application.

The term "rare earth metal" refers to the group as defined by IUPAC, i.e. scandium, yttrium, lanthanum and lanthanides. Specific examples of rare earth metals are yttrium and lutetium.

An "alkali metal" or "alkali" is an element of the first main group of the periodic table and includes lithium, sodium, potassium, and rubidium.

An "alkaline earth metal" or "alkaline earth" is an element of the second main group of the periodic table and includes beryllium, magnesium, calcium, strontium, barium and radium.

A "deprotonating compound" is any compound that can subtract a proton from a binol box compound. Examples are strong organo alkali bases like alkali alkoxides, for example potassium tert.-butanolate, or sodium benzyloxide, alkali metal alkanes like n-butyl lithium, or alkali silyl amides like alkali dimethyl sillyl amide or alkali trimethyl silyl amide.

A "chiral ligand" refers to a unit that has an axial chirality and has at least one chiral center. Because of the axial chirality the unit can occur in at least two enantiomeric forms, one of which is used, i.e. either (R)- or (S)-form is used for the catalyst/initiator system of the present invention.

A "solvent ligand" is a ligand that is based on a solvent, such as tetrahydrofuran, 1,4-dioxane, or diethylether, and can coordinate to the rare earth metal.

A "nucleophilic unit" is a molecule or part of a molecule that can coordinate with a rare earth metal because of a nucleophilic site, such as nucleophilic nitrogen or nucleophilic carbon groups. Examples are substituted amido ligands, (di- or trialkyl methyl-silyl) groups and $C_1$-$C_{20}$ alkoxides.

A "nucleophilic ligand" is a ligand that comprises a nucleophilic unit, i.e. can associate with the rare earth metal because of a nucleophilic site. Examples for a substituted amido ligand or carbon-ligand are $NR^bR^b$, $OR^b$ and $CHR^b R^b$, wherein each of $R^b$, $R^c$, and $R^d$ independently is H or a group selected from linear substituted or unsubstituted $C_1$-$C_{20}$ alkyl, branched or cyclic, substituted or unsubstituted $C_3$-$C_{20}$ alkyl, substituted or unsubstituted $C_6$-$C_{20}$ aryl, substituted or unsubstituted $C_5$-$C_{20}$ heteroaryl, arylalkyl, silylalkyl, wherein the substitution can be as defined below.

Nucleophilic groups are groups having one or more nucleophilic units such as amides or carbanions. Examples are alkyl groups carrying 1-3 mono-, di- or trialkylsilyl amide units.

Alkoxide refers to an O-alkyl group, i.e. a group comprising "alkyl" as defined above and a carbonyl group, such as linear, branched or cyclic alkyl with up to 20 carbon atoms, preferably an O—$C_1$-$C_5$ alkyl group.

A "co-catalyst" when used in the method of the present invention is a compound comprising a nucleophilic unit and an anion. Examples for co-catalysts are salts of a nucleophilic unit and an alkali metal, for example a lithium salt such as (LiN(SiHMe$_2$)$_2$) or a potassium salt, such as (K(N(SiMe$_3$)$_2$).

The integer n+m corresponds to the coordination number or number of association/bonding sites of the rare earth metal that is the core of the catalyst. The number of available sites for coordination or for association or for bonding, respectively, with the rare earth metal is the number that is occupied by ligands. Rare earth metals normally have a coordination number of up to 9. Thus, the sum of n and m can be an integer up to 9, such as 3, 4, or 6. In this application the terms coordination and association and bonding are used interchangeably and shall indicate that the coordinating/associating/bonding group is in a relationship with the available site, the rare earth metal.

A "substituted alkyl" is an alkyl group that is substituted with one or more groups like OH, $NH_2$, NHR, $NR^2$, OH, OR, SH, SR, halogen, wherein halogen comprises chlorine, iodine, fluorine, and bromine, wherein R is $C_1$-$C_4$-alkyl.

The term "alkyl group" comprises linear, branched, or cyclic alkyl with up to 20 carbon atoms, such as linear $C_1$-$C_{20}$-alkyl, an alkyl group having 1 to 20 carbon atoms such as a $C_1$-$C_{10}$ alkyl group, particularly a $C_1$-$C_4$ alkyl group; or branched or cyclic $C_3$-$C_{20}$-alkyl, which refers to alkyl having up to 20 carbon atoms which can be in a line with branches or in a cycle. All of these alkyl groups can be substituted or unsubstituted, wherein a substitution can be a group like OH, $NH_2$, NHR, $NR^2$, OH, OR, SH, SR, halogen, wherein halogen comprises chlorine, iodine, fluorine, and bromine, wherein R is $C_1$-$C_4$-alkyl.

$C_6$-$C_{20}$-aryl refers to an aromatic group, like benzyl, phenyl, naphthyl, biphenyl, fluorenyl, indenyl, anthracenyl etc.

Arylalkyl refers to a $C_6$-$C_{20}$-aryl group substituted with alkyl as defined above.

Silylalkyl refers to silyl units carrying one, two or three $C_1$-$C_4$-alkyl groups. such as $Si(alk)_3$, $SiH(alk)_2$, $SiH_2(alk)$, wherein alk is $C_1$-$C_4$-alkyl.

$C_5$-$C_{20}$-heteroaryl refers to heteroaryl groups, i.e. aromatic groups comprising at least one heteroatom, wherein the heteroatom is selected from N, S, and O. Examples for heteroaryl are furanyl, thienyl, pyrrolyl, pyridyl, isochinolyl, oxazolyl, isoxazolyl, thiazolyl, isothiazolyl etc.

The terms "halogen" or "halogenide" comprise chloro, fluoro, bromo, iodo, or chloride, fluoride, bromide, iodide, respectively.

A "monomer composition" is a composition comprising at least monomers to be polymerized, i.e. β-butyrolactone, and can comprise additionally one or more solvents. If a copolymer shall be produced, the composition can comprise further monomers. As 11-butyrolactone is fluid at room temperature, it can be used as it is. The monomer can also be used in a dissolvent such as tetrahydrofurane, 1,4-dioxane, or diethylether.

The term "solvent" in this application refers to solvents that can have a double function as dissolvent and as solvent ligand, such as tetrahydrofurane, 1,4-dioxane, or diethylether.

The term "dissolvent" comprises solvents as defined above and solvents that are used to dissolve or disperse components of the reaction, such as toluene, dichloromethane, or chloroform.

For polymerizing β-butyrolactone having desirable properties a specific catalyst/initiator system is used. In general the polymerization can be summarized as follows:

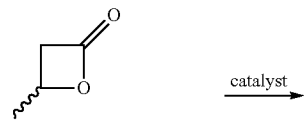

(rac)-BBL  catalyst →

-continued

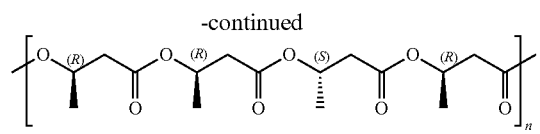

(R)-isotactic PHB with (S)-stereoerrors

The catalyst/initiator system of the present invention comprises a rare earth metal based catalyst and a chiral ligand wherein the rare earth metal is in complex with the chiral ligand which occupies up to 4 and preferably 4 association/bonding sites, at least some of the remaining association/bonding sites of the rare earth metal are occupied by ligands, i.e. nucleophilic ligands and/or solvent ligands, and/or anions like halogenide, triflate, or $C_1$-$C_{20}$ alkoxide up to the coordination number.

The catalyst/initiator system of the present invention can be prepared by reacting a chiral ligand and a rare earth metal based compound. The chiral ligand is an important part of the system, as it provides for the incorporation of one type of enantiomer of β-butyrolactone in the polymer chain. The chiral ligand used according to the present invention is an enantiomer of a compound of formula I:

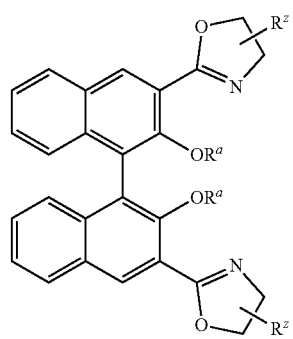

wherein $R^a$ and $R^z$ are as defined above.

This compound is a substituted binaphthol, examples of which are well-known in the art under the name BINOL-box. Methods for producing this type of compounds are well-known to the skilled person and have been published in the literature, for example Kodama, H., Ito, J., Hori, K., Ohta, T., & Furukawa, I. (2000). Lanthanide-catalyzed asymmetric 1, 3-dipolar cycloaddition of nitrones to alkenes using 3, 3'-bis (2-oxazolyl)-1, 1'-bi-2-naphthol (BINOL-Box) ligands. Journal of Organometallic Chemistry, 603(1), 6-12. The core of this compound is a binaphthyl group, i.e. two naphthyl groups connected by a 1-1 bond. Both carry a hydroxy group in position 2 and a heterocyclic group in position 3. This part of the core provides for the complex with the rare earth metal which is necessary for the catalytic activity. The two heterocyclic groups carry a group $R^z$ at position 4 or 5, preferably at position 4. $R^z$ can be substituted or unsubstituted alkyl, substituted or unsubstituted aryl, heteroaryl, or halogen. This group can have an influence on activity and stereoselectiviy of the catalyst and the reaction, respectively, thus it can be used to optimize the catalyst's activity. Moreover, this group should not interfere with or affect the bonding of the rare earth metal to the four specific association sites of this unit. $R^z$ for example can be linear, branched, or cyclic alkyl, such as methyl, ethyl, n-propyl, n-butyl, isobutyl or isopropyl. The alkyl chain can be substituted by groups like hydroxy, amino, halogen. $R^z$ can also be an aryl group like phenyl or naphthyl or a heteroaryl group. $R^z$ can be bound to the oxazolyl group in two configurations. For the chiral ligand of the present invention it is preferred that both groups $R^z$ have the same configuration, i.e. are both (R) or both (S). Therefore, when it is referred to the chiral ligand the term "(R)(R)-BINOL box" means that the two naphthyl rings are in (R) configuration and both $R^z$ groups are in (R) configuration. An (S)(R)-BINOL box refers to a compound wherein the two naphthyl rings are in (S) configuration and both groups $R^z$ are in (R) configuration etc. In this description compounds with index Ph are those where phenyl rings are bound to the oxazolyl groups as $R^z$ group. Compounds with index Bn are those where benzyl rings are bound to the oxazolyl groups as $R^z$ group. Examples are compounds with the following formulae:

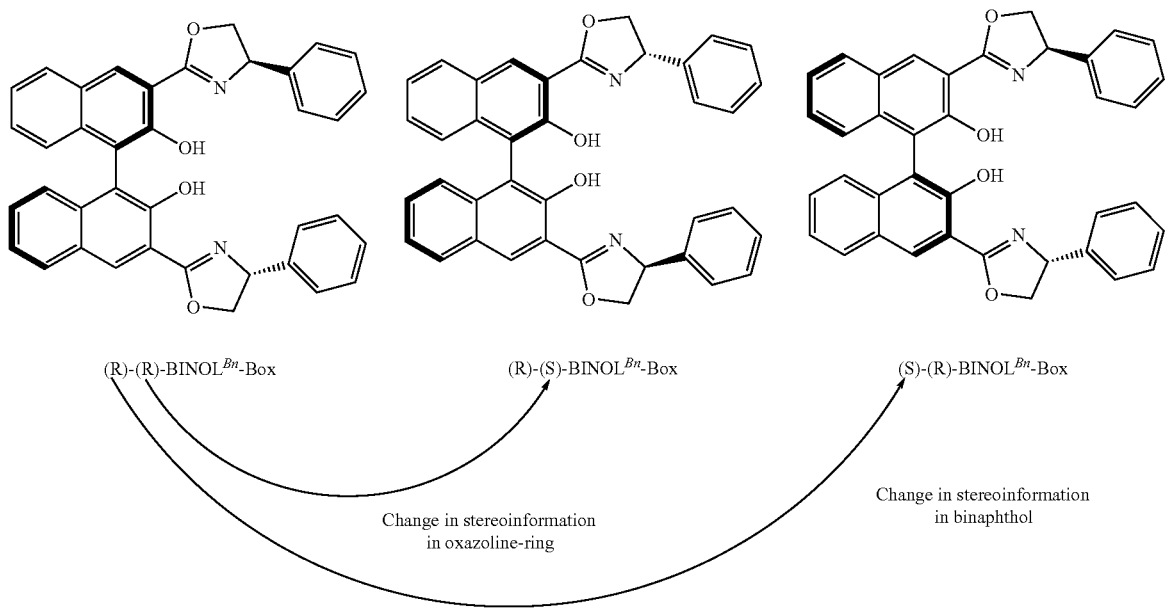

(R)-(R)-BINOL$^{Bn}$-Box (R)-(S)-BINOL$^{Bn}$-Box (S)-(R)-BINOL$^{Bn}$-Box

Change in stereoinformation in oxazoline-ring

Change in stereoinformation in binaphthol

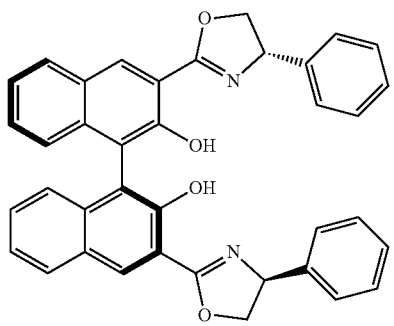

(S)-(S)-(BINOL)$^{Bn}$-Box

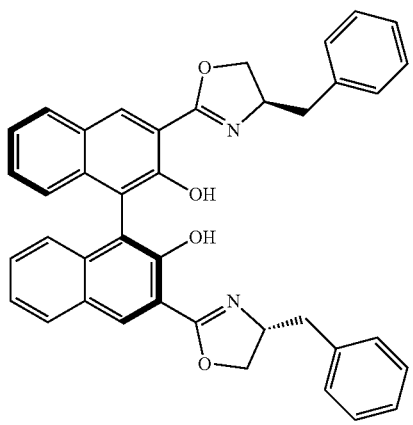

(S)(R)-(Binol)$^{Bn}$-Box

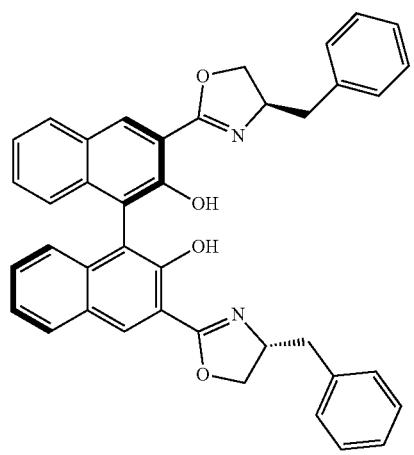

(R)(R)-(Binol)$^{Bn}$-Box

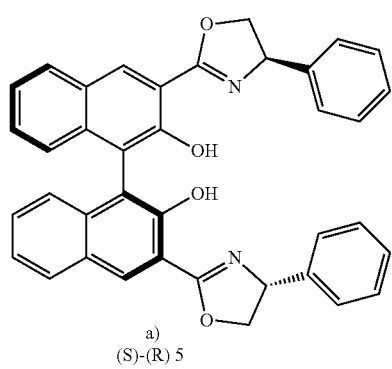

a)
(S)-(R) 5

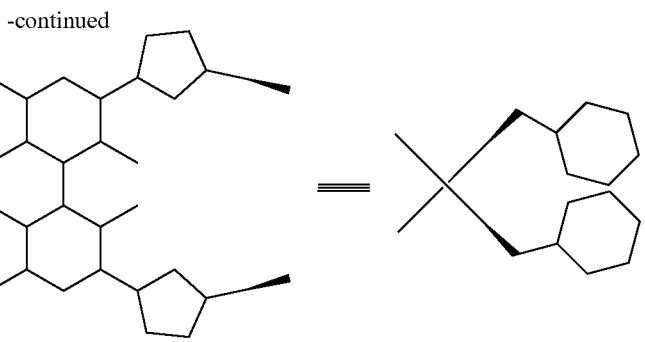

-continued b)

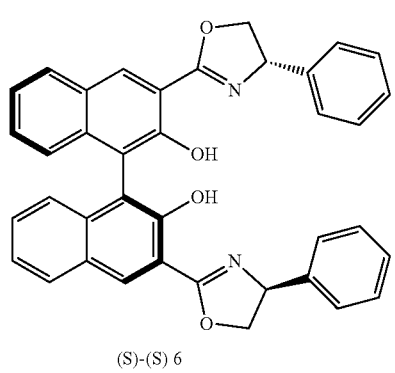

(S)-(S) 6

The chiral ligand as defined above and in the claims is reacted/has been reacted with a rare earth metal based compound to obtain the system that provides activity as polymerization catalyst. In the catalyst/initiator complex in its active form the rare earth metal binds/coordinates at least with the chiral ligand via the two $OR^a$ groups and optionally also via the nitrogen atoms of the heteroaryl rings.

Producing this type of complex is known to the skilled person. There are different approaches to obtain such complexes. The active catalyst/initiator system, which activates a monomer for polymerization is a complex which is formed by contacting the chiral ligand with the rare earth metal based compound. This complex can be obtained either by separate reaction and isolation of the complex or in situ.

In one approach the chiral ligand is contacted with a rare earth metal compound according to formula II. It has been found that a compound of formula II which comprises a nucleophilic ligand is active enough to combine with the OH groups of the chiral ligand (amine elimination reaction), i.e. with $R^a$ being H. In this approach no co-catalyst is necessary, although it can be used. Thus, in a variation of this method, a deprotonating agent like an alkali compound, such as n-butyl lithium can be used to activate one or both OH groups of the chiral ligand for bonding. Well-suited deprotonating agents are those comprising a nucleophilic unit as anionic part. This nucleophilic unit is as defined before and can form a "nucleophilic ligand". In this approach both, the alkali metal of the deprotonating agent and the nucleophilic unit can become part of the catalyst/initiator complex.

It is assumed without being bound by theory that some of the ligands of the rare earth metal compound of formula II are replaced by bonding/association with the chiral ligand but some remain. It is assumed that at least one nucleophilic ligand and optionally at least one solvent ligand are necessary for the activity of the catalyst/initiator complex of the present invention. These ligands can be provided by using a rare earth metal compound of formula II for preparing the complex. As outlined before, in the complex the rare earth metal in addition to the association with the chiral ligand associates with or carries further ligand(s), at least one nucleophilic ligand and/or at least one solvent ligand, to obtain a coordination number of 6, The solvent ligand can be provided by the rare earth metal compound of formula II or can be attached from the reaction mixture, when said mixture comprises a suitable solvent.

The solvent ligand is a solvent molecule, such as a molecule from the solvent used for dissolving the rare earth metal salt and/or the system or which is present in a compound of formula II as $R^y$. A solvent ligand can be exchanged easily when contacted with a monomer. It can be any solvent that is used for this type of compounds and is able to coordinate to metal centers, such as tetrahydrofuran (THF), 1,4-dioxane, diethylether, or pyridine. Other solvents or dissolvents, respectively, can also be used as long as they have no active proton, protic solvents like alcohols or acids are not suitable. Preferred are solvents that have oxygen but no active proton like dioxane, THF, ether, or pyridine.

The nucleophilic ligand can be a nitrogen and/or carbon and/or oxygen comprising group, for example a substituted amino or amido group, such as a dialkylamido, diarylamido or disilylalkylamido group carrying 1-3 trialkylsilyl units, such as N(SiH(alk)$_2$)$_2$ or N(Si(alk)$_3$)$_2$. Examples for carbon comprising nucleophilic groups are groups carrying 1-3 mono-, di- or trialkylsilyl units, such as CH$_2$Si(alk)$_3$, CH(Si(alk)$_3$)$_2$, CH(SiH(alk)$_2$)$_2$, C(Si(alk)$_3$)$_3$, wherein alk is C$_1$-C$_4$-alkyl.

Compounds that are well suited for this approach are yttrium compounds having 3 nucleophilic ligands and up to 3 solvent ligands. The number of ligands depends on the number of available association/binding sites of the metal. A useful rare earth compound is the following:

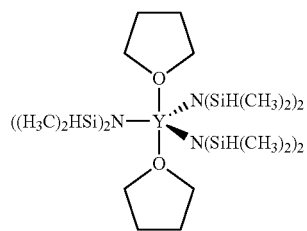

Without being bound by theory it is assumed that when contacting this type of rare earth metal compound with a chiral ligand some of the ligands are replaced by bonds to the chiral ligand, whereas some ligands remain which then provide for the catalytic activity for polymerization.

Scheme 1 below shows an example for preparation and use of a catalyst/intiator complex of the present invention:

The catalyst/initiator complex obtained allows to polymerize β-butyrolactone at room temperature (about 20° C.) and yields isotactic PHB with a P$_m$ of more than 0.5, in particular between about 0.6 and about 0.9, such as about 0.7 to about 0.8, depending on the reaction conditions, the used solvents and the chirality of the chiral ligand, with some imperfections.

It is assumed that when contacting the chiral ligand with a rare earth metal compound like the yttrium compound shown above, the core atom associates with the two hydroxy groups of the binaphthyl and with the two nitrogen atoms of the oxazole rings. This complex can be isolated by washing with an apolar solvent like pentane or diethylether. The catalyst/initiator system is very active and results in a high polymerization rate. Without being bound by theory it is assumed that the number of imperfections increases when the polymerization rate increases, whereas the number of imperfections becomes lower when there is enough time for the system to add the "correct" monomer.

The catalyst/initiator complex can also be used without isolation as can be seen in scheme 2:

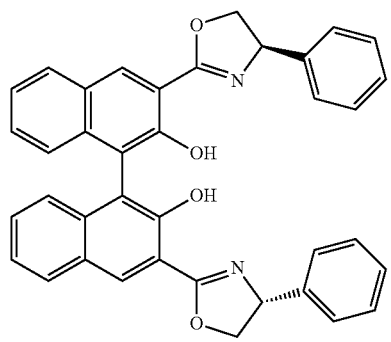

(R)(R)-Binol-Box

+

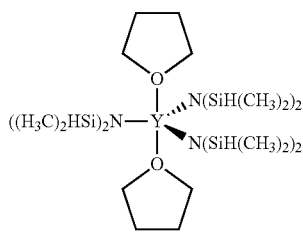

1. Reaction of chiral ligand and rare-earth metal compound
2. Isolation and purification of catalyst
3. Polymerization

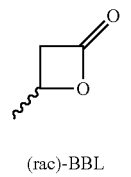

(rac)-BBL

20° C., solvent

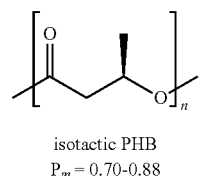

isotactic PHB
P$_m$ = 0.70-0.88

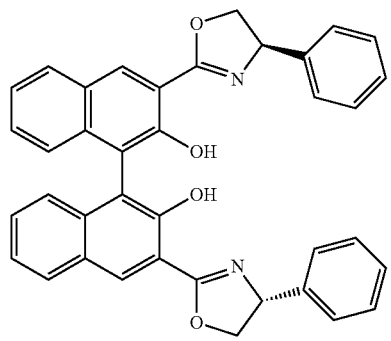

(S)(R)-Binol-Box

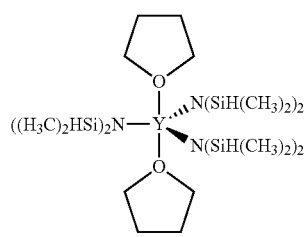

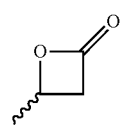

(rac)-BBL

1. Reaction of chiral ligand and rare-earth metal compound
2. Polymerization with in situ generated species 20° C., solvent

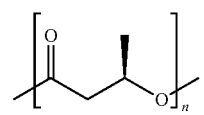

isotactic PHB
$P_m = 0.70$

The reaction is carried out in a solvent or dissolvent as defined like THF, toluene, dichloromethane. The reactants can be reacted at any convenient temperature, for example at room temperature (about 20 to 25° C.) for some time, the reaction temperature and the reaction time are not critical, the reaction time can be a few minutes up to an hour, for example 10 to 40 minutes, but also longer, such as overnight. If an in situ catalyst/initiator system is used the reagents can be reacted for some minutes up to a day or more, such as 0.5 to 24 hours or 1 to 12 hours, for example overnight.

As an example the active catalyst/initiator system is prepared in situ, the reaction mixture comprising the catalyst/initiator complex is used directly for polymerization of 11-butyrolactone. It was found that when this system is used for a polymerization carried out at room temperature (about 20 to 25° C.), PHB can be obtained with an isotacticity/$P_m$ of about 0.70. Thus, when using an isolated catalyst/initiator complex the number of imperfections is lower than when using catalyst/initiator complex without isolation. This shows that one measure to control isotacticity of the polymer is to control the purity of the catalyst/initiator complex—the higher the purity of the catalyst/initiator complex the lower the amount of imperfections and the higher the isotacticity.

In another embodiment the active catalyst/initiator system is prepared by deprotonating a chiral ligand of formula I and reacting it with a rare earth metal compound like yttrium chloride as rare earth metal compound in the presence of an oxygen containing solvent which can serve as a solvent ligand $R^y$. Thereafter, the complex obtained is reacted with a co-catalyst and subsequently polymerization is performed as can be seen in Scheme 3

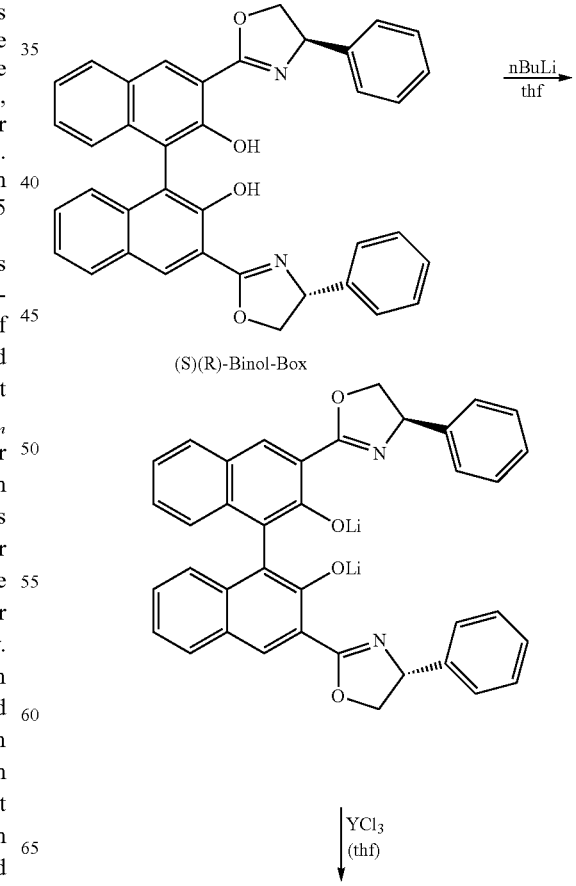

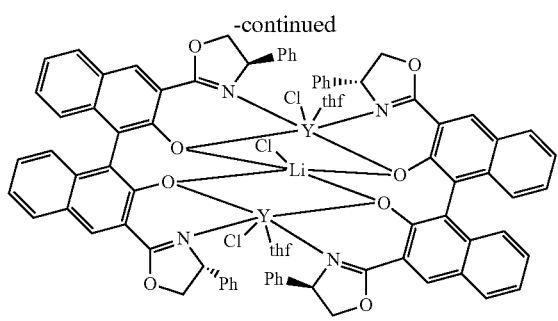

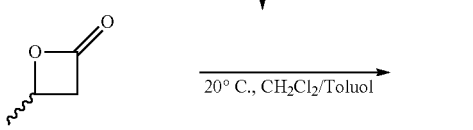

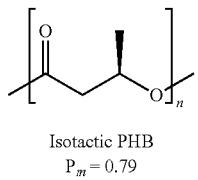

(rac)-BBL

Isotactic PHB
$P_m = 0.79$

In this case the chiral ligand is activated by a deprotonating agent like nBuLi and, thus, makes available the binding sites for the rare earth metal. Furthermore, the rare earth metal compound is added as rare earth metal salt, such as halogenide. After isolation the compound is activated with co-catalyst, e.g. lithium bis(dimethyl)silyl amide (LiBDSA) to provide at least one nucleophilic ligand. The catalyst/initiator complex obtained is used for polymerization, it is active at room temperature and yields PHB with high isotacticity of about 0.79. It has been found that the use of a co-catalyst reduces the number of imperfections and increases the degree of isotacticity. At the same time polymerization speed is reduced.

Figure 9:
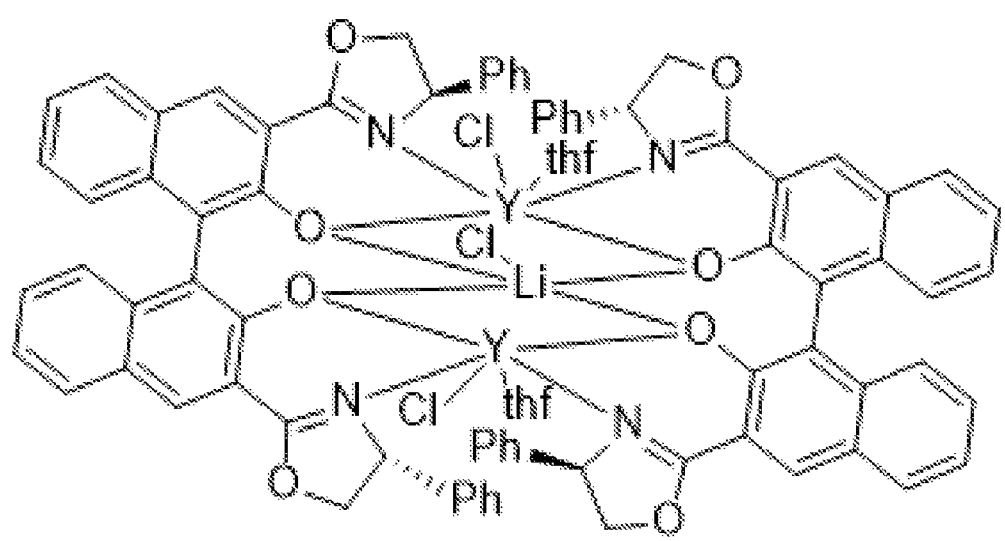
FIG. 9 shows an embodiment of a catalyst/initiator complex.

Without being bound by theory the structure of one embodiment of a catalyst/initiator complex of the present invention can be found in FIG. 9.

A further embodiment is shown in Scheme 4, where a deprotonating agent is used to deprotonate the OH groups of the chiral ligand and the activated chiral ligand then is reacted with a rare earth metal compound of formula II to form a catalyst/initiator complex of the present invention. This catalyst/initiator complex can be isolated by using a solvent like pentane. It is also possible to use the reaction mixture without isolation.

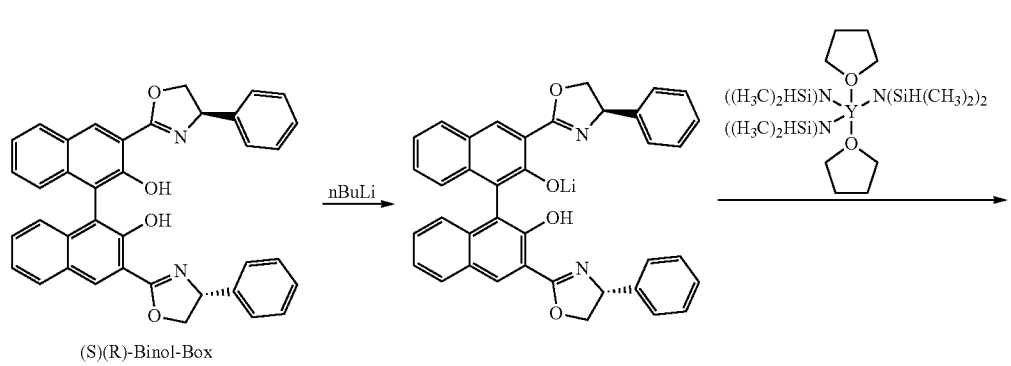

or

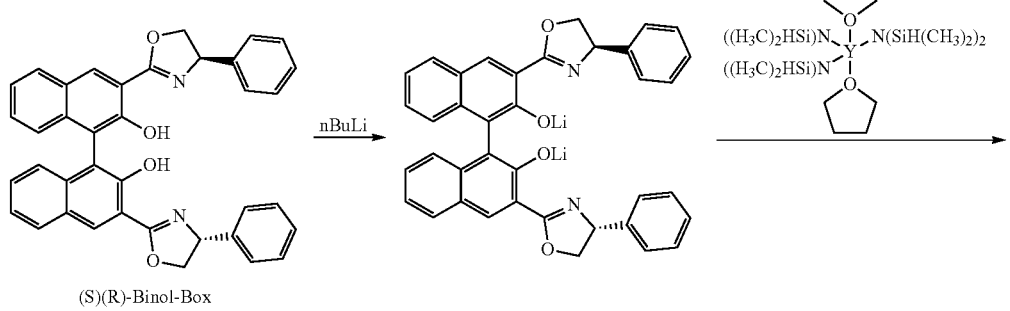

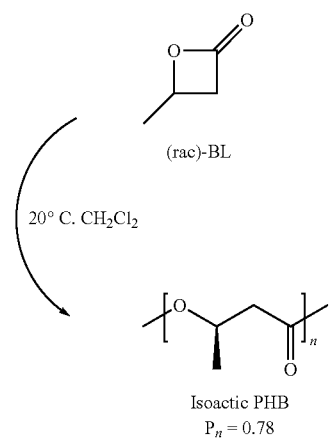

Isoactic PHB
$P_n = 0.78$

The catalyst/initiator system of the present invention that can be obtained as outlined above provides for stereospecific polymerization because of its structural composition. The catalyst/initiator system of the present invention comprises as essential part a chiral ligand, a 1,1'-binaphthol based ligand which is referred to as chiral ligand. As outlined before, this ligand has at least two chiral centers, the chirality of the binaphthol, and the position of the two substituents $R^z$. Thus, the chiral ligand can be in (R)(R)—, (S)(R)—, (R)(S)- and (S)(S)-form. This form has an influence on the microstructure which is obtained for the polymer. It is easy to find out which monomer is preferred by a chosen catalyst/initiator complex by some routine tests.

For preparing the catalyst/initiator system of the present invention either the components can be reacted separately, isolated and then used in isolated form or the components can be mixed and the mixture can be used as it is without isolation.

It has been found that the purer the catalyst system is, the more selective it is, i.e. the higher the amount of isotacticity is. With the isolated catalyst/initiator system an isotacticity rate of up to about 0.9, such as up to about 0.88 can be obtained. Thus, the degree of isotacticity can be controlled by using an isolated versus an in situ catalyst/initiator complex.

Critical for the catalyst/initiator system of the present invention is that it comprises a chiral ligand, a rare earth metal atom as core or catalytic atom, at least one nucleophilic ligand and optionally at least one solvent ligand which can be exchanged for a monomer for the polymerization reaction.

The catalyst/initiator system of the present invention selectively polymerizes one enantiomer of β-butyrolactone, either (R)—β-butyrolactone or (S)—β-butyrolactone, with some imperfections, which is desirable.

The polymerization reaction takes place in solution. The β-butyrolactone can be used as solvent or a dissolvent that can dissolve the reactants can be used. Examples for useful dissolvents are toluene, THF, 1,4-dioxane, chloroform, pyridine, trichlorobenzene, bromo/chloro-benzene, tert-Butylmethylether, diethyleneglycol, trichloroethane, triglyme, benzene, tetrachloromethane, di-n-butylether, mesitylene, o-, p-, or n-xylene, acetonitrile, dimethylformamide, and dichloromethane. It is also possible to run the polymerization without a solvent because the monomer, i.e. β-butyrolactone, can serve as solvent itself. As, however, the system becomes more viscous when the polymer chains become longer, a solvent is advisable if high molecular weights are considered.

It was found that the slower the polymerization reaction is the more exact the monomers are added to the polymer chain so that the isotacticity becomes higher. On the other hand, when speed is increased, for example by increasing the temperature of the reaction the polymerization rate becomes faster and the number of imperfections increases. In this case isotacticity decreases.

Furthermore, it was found that a solvent ligand in the catalyst/initiator complex or, in case of an in situ catalyst/initiator complex, the solvent or dissolvent used, have an influence on isotacticity. Without being bound by theory it is assumed that this is due to the fact that the solvent ligand in the catalyst/initiator system has an influence on the type of monomers that is taken up and added to the polymer chain. In this regard it was found that dichloromethane and toluene are good dissolvents to obtain an isotacticity in the desired range, i.e. 60 to 80% isotacticity. Toluene is a dissolvent that increases the speed of polymerization. The solubility is not as high as with dichloromethane so that polymer chains precipitate when they become too long. Therefore, toluene can be used as dissolvent if polymers with a medium to low molecular weight are desired. Furthermore, THF is a solvent that coordinates very well with the rare earth metal and can be added as ligand. Thereby, catalyst activity and polymerization speed can be decreased, which has an influence on isotacticity, it is lower.

Any factor, that has an influence on the polymerization rate can also influence isotacticity. Therefore, the ratio of monomer and catalyst can also influence isotacticity.

By controlling the isotacticity of the polymer built with the catalyst/initiator system of the present invention and by controlling the number of imperfections, it is possible to fine tune the properties of the polymer that is obtained. Thereby the mechanical properties of the polymer can be optimized. By selecting the temperature, the solvent, the configuration of the chiral ligand and the ligands of the rare earth metal-based catalyst it is possible to produce PHBs with different microstructures. This is particularly valuable.

Another aspect of the present invention are polymers that have been obtained with a method as described. These polymers are superior to known polymers as they have a high enough isotacticity to be biodegradable but have a controllable number of imperfections to allow for superior mechanical properties and have a polydispersity in a desired range. A desirable range of isotacticity is 50 to 90%, preferably 55 to 85%, and in particular 60 to 80%. A desirable polydispersity is less than 5.

The polymers obtained with the method of the present invention have been analyzed with methods as described in the following. To find the best suited catalyst/initiator system for a specific polymer, experiments can be carried out as is explained in detail below.

NMR kinetic experiments can be carried out to determine catalyst activities as is known to the skilled person. For this purpose, conversions from NMR values are recorded in a conversion or turnover per time diagram. From the conversion rates it can be seen that either the S-monomer or the R-monomer is consumed as about 50% of the monomer is consumed and about 50% of the monomer remain, this shows that only one of the enantiomers of the β-butyrolactone has been consumed, by analyzing which of both enantiomers remains in solution it can be analyzed which preference the system has. FIG. 1 shows a conversion per time diagram for racemic β-butyrolactone using a catalyst/initiator system as described in detail with reference to the schemes. From the curve it can be seen that only one enantiomer was converted. To determine if a system is specific for R- or S-monomer, experiments with either R-monomer or S-monomer can be conducted.

Isotacticity is analyzed as is known in the art. $^{13}$C-NMR-spectroscopy can be used to determine the microstructure of the polymer obtained with a process of the present invention. For analysis it is possible to either evaluate the carbonyl signal at 169 ppm (see FIG. 2a) or the methylene signal at 40 ppm (see FIGS. 2b-d). The ratio between the isotactic part of the polymer (mm and rm) and the syndiotactic part (rr and mr) has been evaluated.

Figure 2:
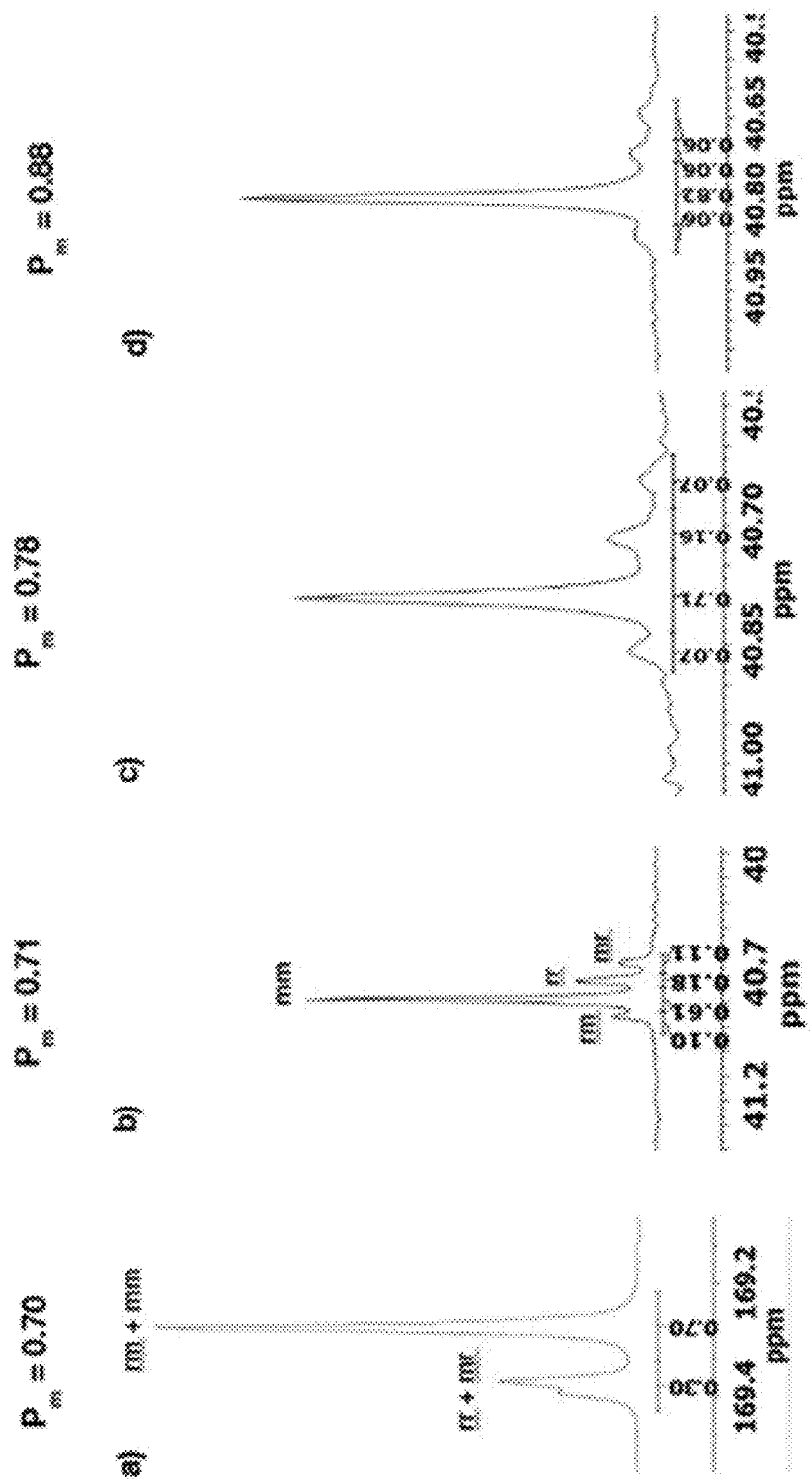

Evaluated is the probability for meso-connections ($P_m$-value; meso=two adjacent centers having the same orientation). FIG. 2 shows some spectra of PHB samples in deuterated chloroform with different isotacticity ratios from 0.70 to 0.88.

Figure 3:
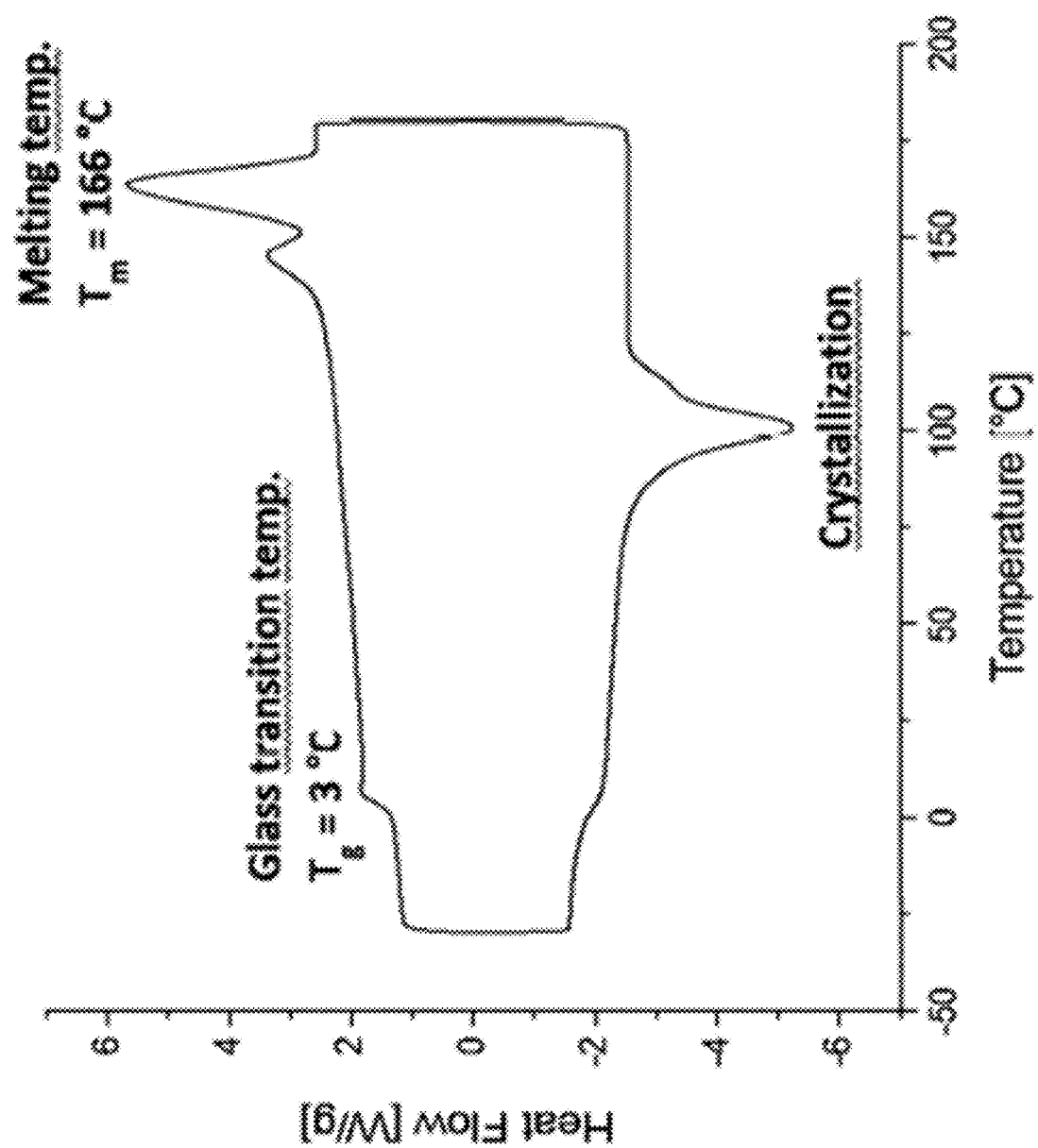

The thermal properties of the polymer can be evaluated by DSC determination. It is the object of the present invention to provide polymers having a lower melting temperature than the isotactic PHBs known in the art. FIG. 3 shows the DSC diagram for a PHB sample that has been obtained using the process of the present invention. It can be seen that the melting temperature $T_m$ is 166° C. and, thus, lower than the melting point of known polymers.

For molecular weight determinations, GPC analysis can be used as is known in the art. For polymers produced with the catalyst/initiator system of the present invention GPC analysis was carried out on a Polymer Laboratories GPC50 Plus chromatograph. As eluent, chloroform was used. Polystyrene standards were used for calibration.

It was found that the polymers obtained with a process of the present invention have very valuable properties. The mechanical properties are similar to those of petroleum based polymers like isotactic polypropylene and, therefore, can be used for similar applications, such as packaging. PHB polymers of the state of the art have a melting point which is close to the decomposition point, processability of these polymers is restricted. In contrast thereto the polymers obtained with the process of the present invention have a much better processability because their melting point is lower. Furthermore it has been found that when using the process of the present invention polymers are obtained which have a higher tensile strength than those isotactic PHBs known from the prior art. Thus, with the process of the present invention it is possible to improve the mechanical properties of PHB polymers. As those polymers have only some imperfections but otherwise are highly isotactic, they have a high biodegradability and can be used as biodegradable polymers. Furthermore, it has been found that other useful properties like barrier properties are maintained with the polymers of the present invention. In particular the present invention provides polymers by using the method and the catalyst/initiator combination of the present invention with an isotacticity in the range between 0.50 and 0.80, in particular in the desired range between 0.60 and 0.80, such as more than 0.60 and less than 0.80. It is also possible to obtain polymers with a Đ of less than 5, such as between 1.49 and 4.99. The method allows to obtain polymers with high, medium or low polymer mass and low or medium polydispersity.

In summary the present invention provides a process for obtaining very valuable polymers with predeterminable parameters.

The invention is further illustrated in the following examples.

EXAMPLE 1

Catalysts of the present invention were tested. The catalysts were obtained by reacting one of the following ligands as "chiral ligand" (L) and an yttrium or lutetium compound [M].

Polymerization reactions were carried out and the following general polymerization procedure was used:

Polymerization of rac β-BL was carried out in a glovebox for the stated periods. The polymerization was performed using a ratio of lanthanide to ligand to monomer ratio of 1:1:200 or 1:1:400. Therefore, one equivalent of [M] and one equivalent of the ligand was dissolved in 1 mL of the respective solvent each. Subsequently, the two solutions were combined and stirred for 10 minutes. The polymerization was initiated by addition of the respective amount of the monomer in one portion. After the stated time, the polymerization was quenched by addition of deuterated chloroform. An aliquot sample was taken to determine the conversion via proton nmr-spectroscopy. The polymer was precipitated in methanol and dried overnight.

The following chiral ligands were tested:
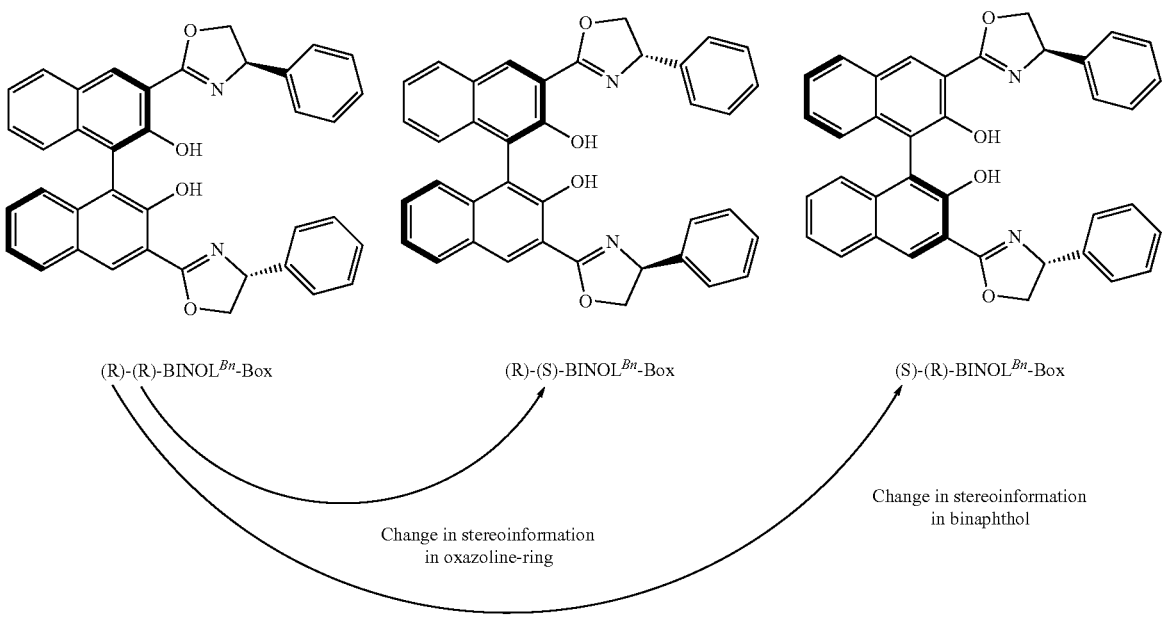
(R)-(R)-BINOL$^{Bn}$-Box      (R)-(S)-BINOL$^{Bn}$-Box      (S)-(R)-BINOL$^{Bn}$-Box
Change in stereoinformation in oxazoline-ring
Change in stereoinformation in binaphthol
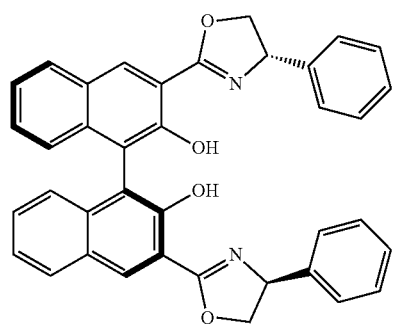
(S)-(S)-(BINOL)$^{Bn}$-Box
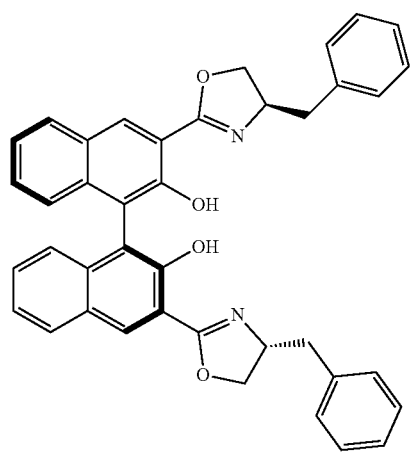
(S)(R)-(Binol)$^{Bn}$-Box
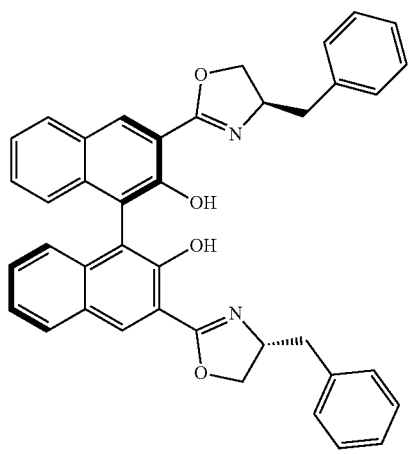
(R)(R)-(Binol)$^{Bn}$-Box Test runs for polymerization of rac-β-butyrolactone (rac β-BL) were carried out with systems according to the present invention, where the above shown BINOL-Box Ligands [L] were used with $Y[(N(SiHMe_2)_2)_3(THF)_2]$ [M] as rare earth metal compound and with dichloromethane (DCM), toluene (tol) or tetrahydrofurane as dissolvent or solvent ligand, respectively. All reactions were performed at 300 K in mml solvent with a ratio of [M]/[L]{rac-β-BL]=1/1/200 and a concentration of rac β-BL of 2.44 mmol ml$^{-1}$. Molar mass Mn was determined by GPC analysis in chloroform versus polystyrene standards. Polydispersity values Mw/Mn were determined by GPC analysis. Furthermore, percentage isotacticity was measured as probability of racemic linkage between monomer units and was determined by $^{13}$C-NMR spectroscopy using the carbonyl region.

The results are summarized in Table 1

TABLE 1

ROP of (rac)-β-BL

| Entry | Ligand | solvent | t [h] | conversion [%] | Mn (×103) [g mol−1] | Mw/Mn | Pm |
|---|---|---|---|---|---|---|---|
| 1 | (R)(R)Ph | DCM | 18 | 7 | 70.1 | 1.62 | 0.70 |
| 2 | (R)(R)Ph | Tol | 18 | 17 | 51.1 | 1.49 | 0.66 |
| 3 | (R)(R)Ph | THF | 2 | 12 | n.d. | n.d. | 0.71 |
| 4 | (S)(R)Ph | DCM | 18 | 55 | 35.1 | 2.76 | 0.65 |
| 5 | (S)(R)Bn | DCM | 26 | 89 | 105.5 | 3.58 | 0.61 |
| 6 | (S)(R)Bn | Tol | 26 | 81 | 62.5 | 4.99 | 0.68 |
| 7 | (S)(R)Bn | Tol | 19 | 67 | 93.7 | 5.5 | 0.68 |

As can seen the combination of catalyst and initiator is active in catalyzing the reaction of rac β-BL. By choosing ligand, solvent, temperature, reaction time, and/or rare earth metal it is possible to adapt percentage conversion, molecular mass of the polymers, polydispersity index and isotacticity. With the method and the catalyst/initiator combination of the present invention it is possible to obtain polymers with an isotacticity in the range between 0.50 and 0.80, in particular in the desired range between 0.60 and 0.80. It is also possible to obtain polymers with a PDI of less than 5, such as between 1.49 and 4.99. The method allows to obtain polymers with high, medium or low polymer mass.

EXAMPLE 2

Polymerisations were carried out as described in example 1 but with a ratio of [M]/[L]{rac-β-BL]=1/1/400. The results are shown in table 2.

TABLE 2

| Entry | Ligand | solvent | t [h] | conversion [%] | Mn (×10$^3$) [g mol-1] | M$_w$/M$_n$ | P$_m$ |
|---|---|---|---|---|---|---|---|
| 1 | (R)(R)Ph | Tol | 17 | 10 | 112.5 | 6.54 | 0.73 |
| 2 | (R)(R)Ph | DCM | 17 | 5 | 146 | 2.65 | 0.74 |
| 2* | (R)(R)Ph | THF/DCM[a] | 13 | 19 | n.d. | n.d. | 0.79 |
| 3 | (R)(S)Ph | DCM | 1.5 | 33 | 48.9 | 2.69 | 0.67 |
| 4 | (R)(S)Ph | Tol | 1.5 | 35 | 52.6 | 3.15 | 0.63 |
| 5[b] | (R)(R)Ph | DCM | 5 | 11 | n.d. | n.d. | 0.81 |

Figure 4A:
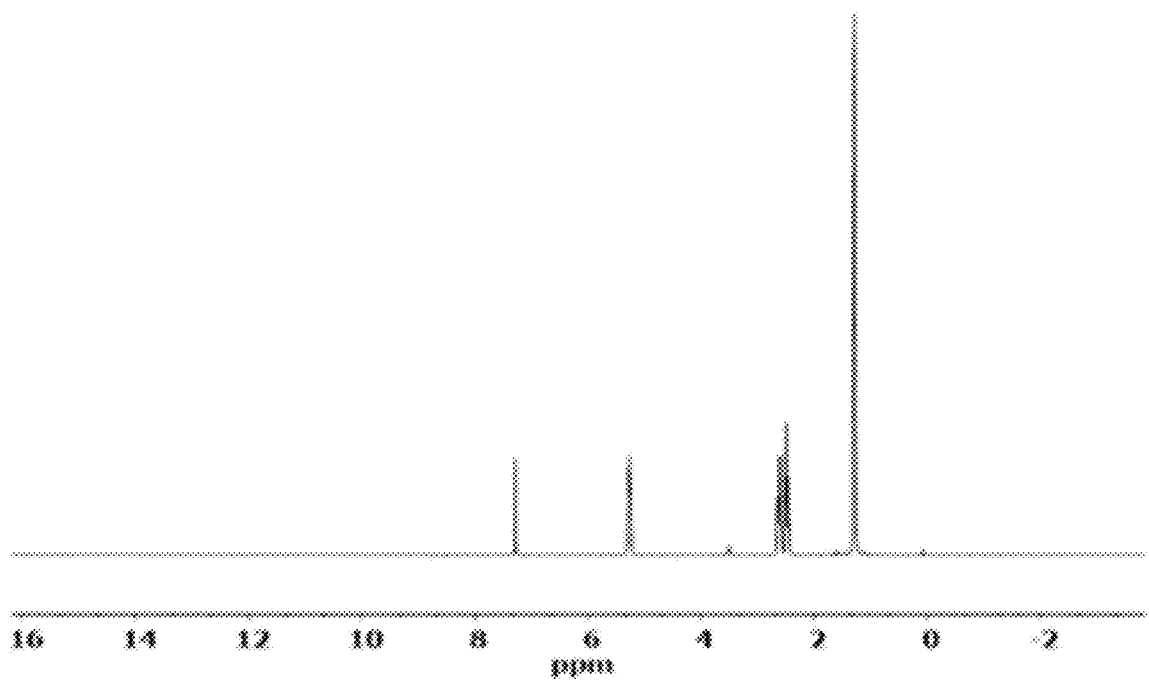
Figure 4B:
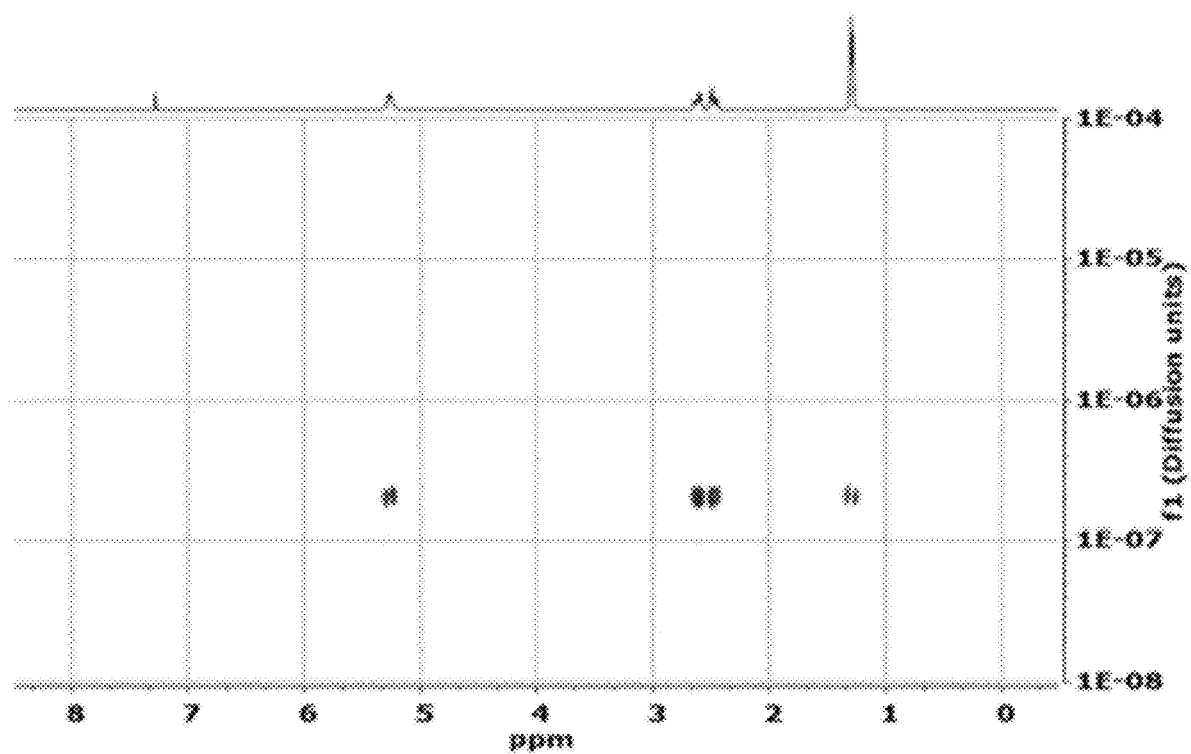
Figure 5:
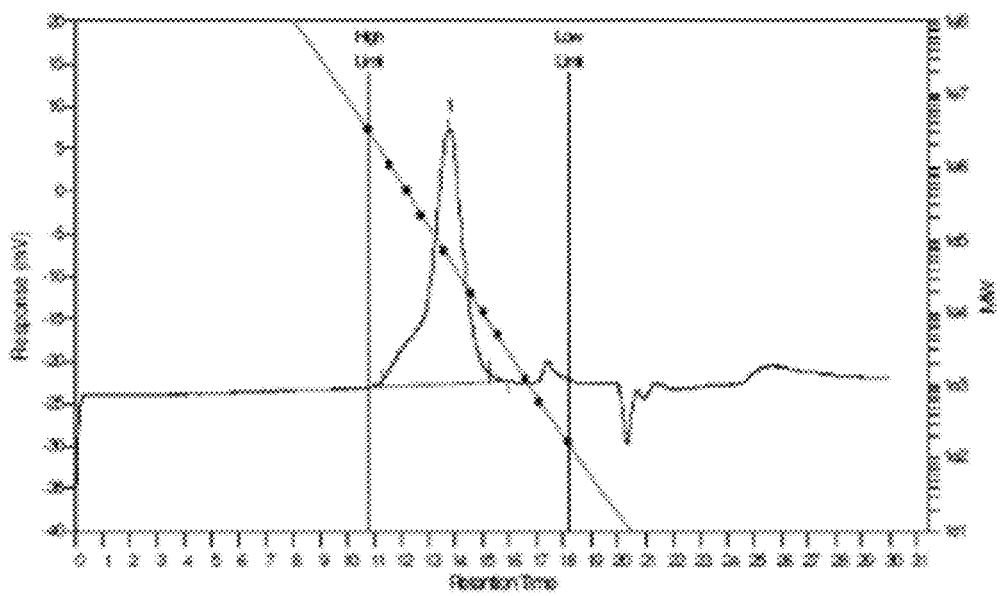
FIG. 5 and FIG. 6 show GPC spectra of PHB polymers obtained with the method of the present invention. Molecular weight and polydispersities of PHB were measured via gel permeation chromatography (GPC) with samples of 2-3 mg/ml concentration on a PL-GPC 50 Plus from Polymer Laboratories using a refractive index (RI) detector with chloroform as eluent relative to polystyrene standards.
Figure 6:
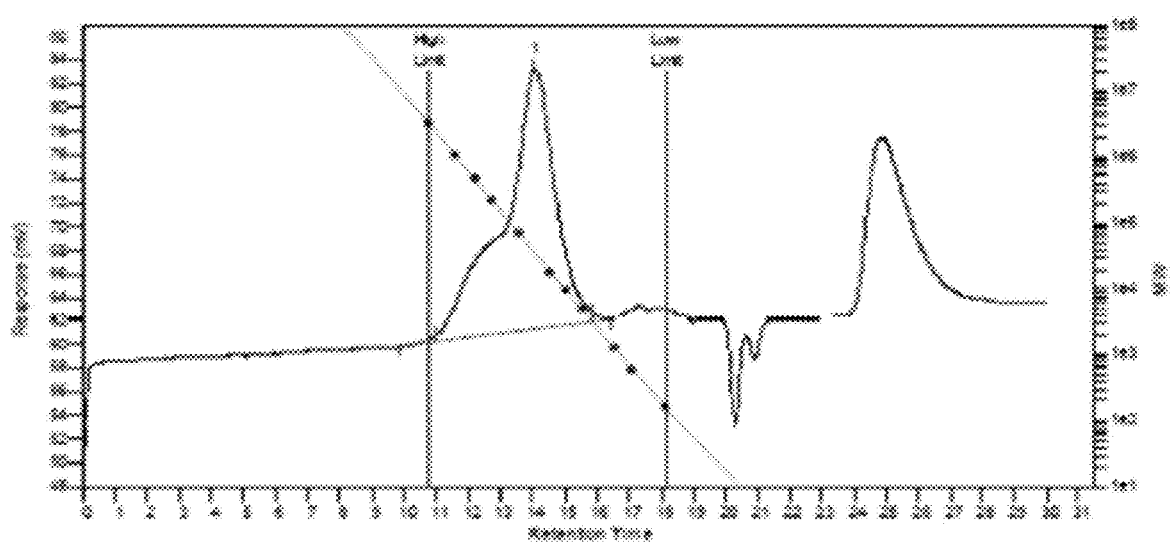

(a) complexation in THF, reaction in DCM (b) 1000 eq. of (rac)-β-BL n.d.=not determined The polymer obtained in run 3 was analysed by $^1$H and DOSY-NMR. The results are shown in FIGS. 4a and 4b. The analytical data show that no polymer blend was obtained, but only one polymer species formed (only one set of signals with one diffusion coefficient).

EXAMPLE 3

Polymerizations were run as described in example 1, wherein however $Lu[(N(SiHMe_2)_2)_3(THF)_2]$ was used as rare earth metal complex instead of $Y[(N(SiHMe_2)_2)_3(THF)_2]$, toluene was used as solvent. The results are shown in table 1, entry 7. It can be seen that also lutetium complexes are useful for catalyst/initiator systems of the present invention.

EXAMPLE 4

Polymerizations were also performed as shown in Scheme 3 with and without a co-catalyst [Co—C] and the (S)(R)-complex [M] depicted in this Scheme.

It was found that no reaction occurred when 400 eq. rac β-BL were reacted with the complex without co-catalyst. Thus, a co-catalyst is necessary, which generates a nucleophilic ligand at the yttrium center via salt-metathesis. The best results were obtained when using 2 eq. $K[N(SiMe_3)_2]$ and 200 eq. of rac β-BL. The results are shown in table 3.

TABLE 3

| Entry | Co-catalyst | [M]/[Co-C]/[BL] | solvent | t [h] | conversion [%] | Mn (×10$^3$) [g mol-1] | M$_w$/M$_n$ | P$_m$ |
|---|---|---|---|---|---|---|---|---|
| 1 | $K[N(SiMe_3)_2]$ | 1/2/200 | Tol | 0.6 | 35 | 30.7 | 5.1 | 0.76 |
| 2 | $Li[N(HSiMe_2)_2]$ | 1/2.2/200 | Tol | 25 | 12 | 4.8 | 1.40 | 0.76 |

EXAMPLE 5

A catalyst of the present invention was prepared as follows:

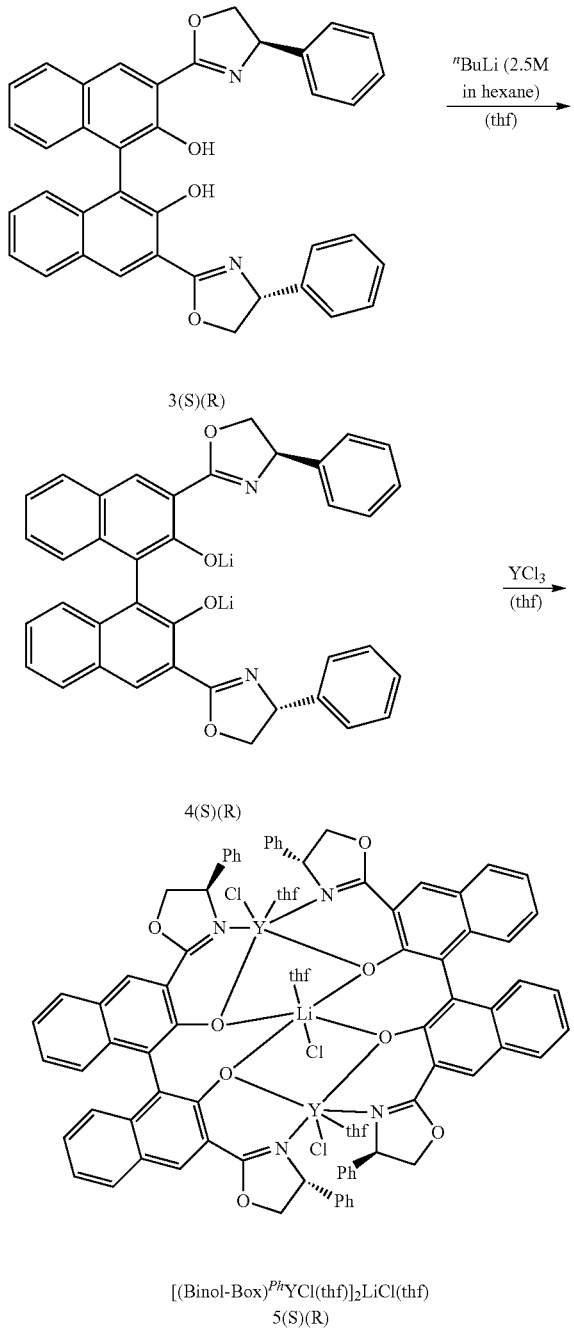

Synthesis of Li$_2$[(Binol-Box)Ph] (4)

1.30 g of 3 (2.25 mmol, 1.0 eq.) were dissolved in 25 ml thf under argon atmosphere and were cooled to 0° C. 3.05 mL n-Butyllithium (2.5 M in hexane, 2.2 eq.) were slowly added and the reaction mixture was stirred at room temperature for 2 hours. The lithiated ligand Li$_2$[(Binol-Box)Ph] 4 was used for the next step without isolation and further purification.

$^1$H NMR (300 MHz, THF-d$_8$, 298 K): δ(ppm)=8.27 (s, 2H), 7.58-6.78 (m, 8H), 5.29 (t, J=9.6 Hz, 2H), 4.39 (dd, J=9.6, 8.1 Hz, 2H), 3.77 (dd, J=9.6, 8.1 Hz, 2H).

Synthesis of [(Binol-Box)$^{Ph}$YCl(thf)]$_2$LiCl(thf) (5)

One equivalent of anhydrous YCl$_3$ (440 mg, 2.25 mmol) was suspended in 30 mL thf and heated for 90 minutes at 60° C. The solution of 4 in thf is added dropwise at room temperature and the reaction mixture is stirred over night. The solvent is removed in vacuo and the residue is washed five times with 40 mL toluene via whatman filtration. The solvent is removed under reduced pressure. Precipitation from thf/pentane at 0° C. led to a yellow solid. Recrystallization from thf at −20° C. led to crystals suitable for X-ray analysis. 5(S)(R)$^{Ph}$:

Yield: 1.28 g (1.66 mmol, 73%)

$^1$H NMR (500 MHz, CDCl$_3$, 298 K): δ (ppm)=8.44 (s, 1H), 7.79 (d, J=8.2 Hz, 1H), 7.70 (d, J=8.2 Hz, 1H), 7.46 (s, 1H), 7.35-7.13 (m, 9H, overlapping with residual proton signal of solvent), 7.05 (t, J=7.6 Hz, 2H), 6.98 (t, J=7.6 Hz, 2H), 6.92 (t, J=7.6 Hz, 2H), 6.39 (d, J=8.7 Hz, 1H), 5.74 (t, J=9.5 Hz, 1H), 5.54 (dd, J=9.2, 5.1 Hz, 1H), 4.54 (t, J=9.5 Hz, 1H), 4.24 (t, J=9.2 Hz, 1H), 4.07 (dd, J=9.2, 5.1 Hz, 1H), 3.88 (t, J=9.5 Hz, 1H), 3.49 (s, 6H), 3.34 (s, 6H), 1.70-1.42 (m, 12H).

$^{13}$C NMR (126 MHz, CDCl$_3$, 298 K): δ (ppm)=168.8, 167.3, 160.3, 157.12, 141.3, 141.0, 137.9, 137.50, 132.5, 132.4, 130.2, 129.0, 128.8, 128.7, 128.3, 128.0 (d, J$_{Y,C}$=6.8 Hz), 127.7, 127.5 (d, J$_{Y,C}$=6.0 Hz), 126.3, 125.0, 124.7, 120.7, 119.5, 116.9, 116.3, 74.4, 73.9, 70.8, 69.6, 68.62, 25.3.

| EA: | calculated: | C 63.80 | H 4.62 | N 3.38 |
|---|---|---|---|---|
| | found: | C 63.44 | H 4.71 | N 3.43 |

Figure 7:
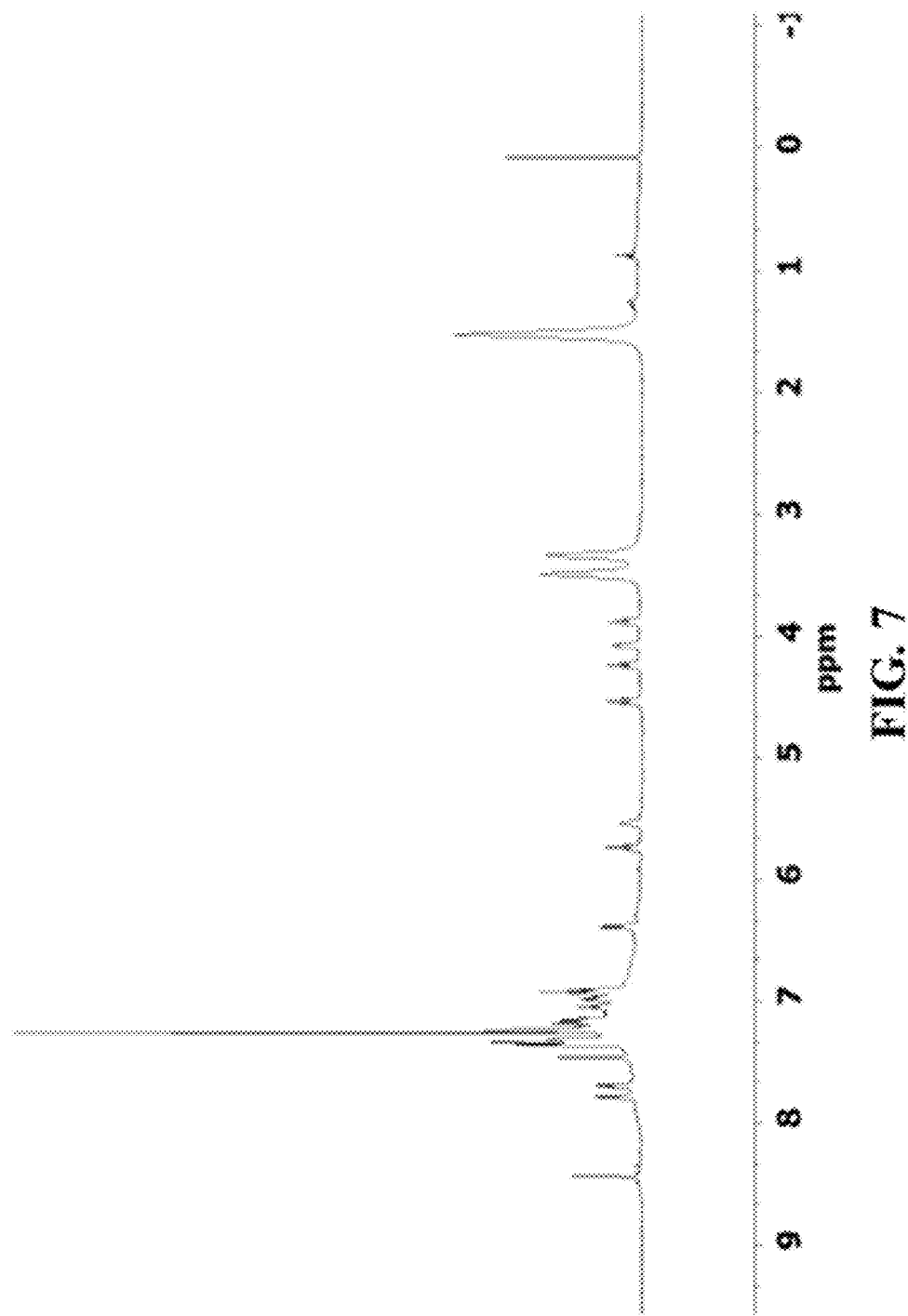
FIG. 7 shows 1H-NMR spectrum of 5(S)(R)Ph.
Figure 8:
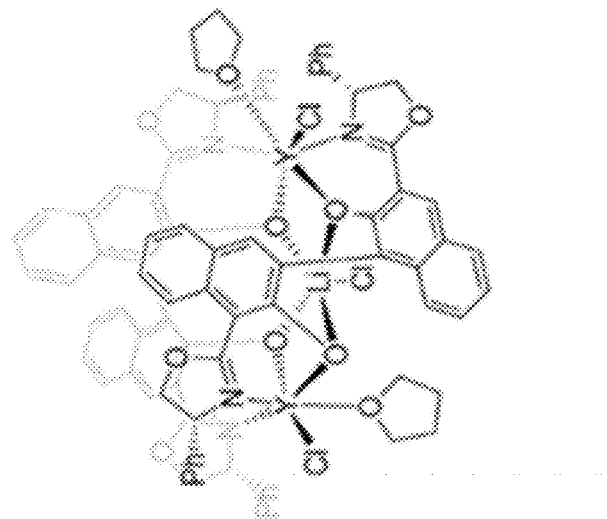
FIG. 8 shows the crystal structure of 5(S)(R)Ph.
Figure 8:
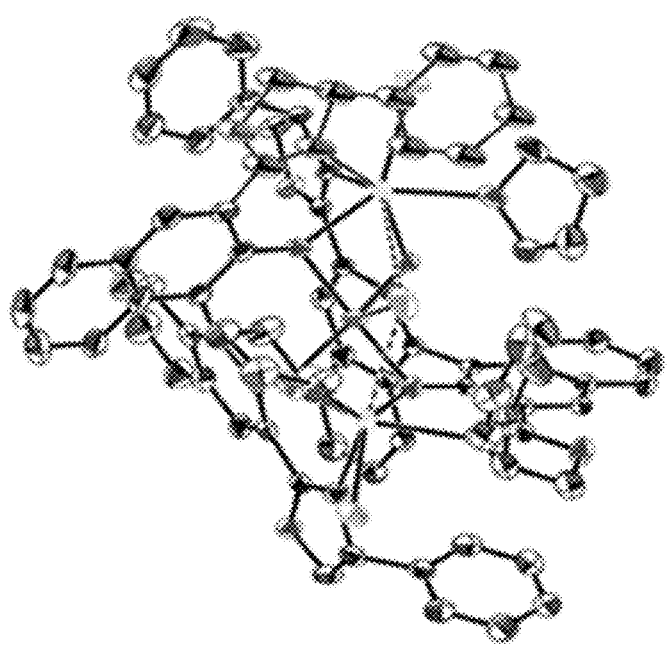

The $^1$H-NMR spectrum of 5(S)(R)$^{Ph}$ is shown in FIG. 7. The crystal structure of the catalyst (S)(R)$^{Ph}$ is shown in FIG. 8.

EXAMPLE 6

Materials and Methods

A chiral ligand was prepared as outlined in the following.

All reactions were carried out under argon atmosphere using standard Schlenk or glovebox techniques. All glassware was heat dried under vacuum prior to use. Unless otherwise stated, all chemicals were purchased from Sigma-Aldrich, Acros Organics, or ABCR and used as received. Toluene, thf, diethylether, dichloromethane and pentane were dried using a MBraun SPS-800 solvent purification system. Hexane was dried over 3 Å molecular sieves. The monomer, β-butyrolactone, was dried over calcium hydride and distilled prior to use.

NMR spectra were recorded on a Bruker AVIII-300, AVIII-400, AVIII-500 and AVIII-500 Cryo spectrometer. Unless otherwise stated, $^1$H- and $^{13}$C-NMR spectroscopic chemical shifts δ are reported in ppm. δ (1H) is calibrated to the residual proton signal, δ (13C) to the carbon signal of the solvent. Unless otherwise stated, coupling constants J are averaged values and refer to couplings between two protons. Deuterated solvents were obtained from Sigma-Aldrich and dried over 3 Å molecular sieves.

Elemental analyses were measured at the Laboratory for Microanalysis at the Institute of Inorganic Chemistry at the Technische Universität München. Single Crystal X-ray Crystallography was performed in the SCXRD laboratory of the Catalysis Research Center at Technische Universität München.

The tacticity determination of PHB was performed by $^{13}$C-NMR-spectroscopy at room temperature. Deuterated chloroform was used for NMR. Spectra for the analysis of PHB mm, mr/rm and rr triads were recorded with a sample concentration of 15 mg/0.6 mL CDCl$_3$ on a AVIII 500 Cryo spectrometer and analyzed according to literature. DSC measurements are carried out on a TA Instruments DSC-Q2000 with heating rates of 10 K/min.

Synthesis Route

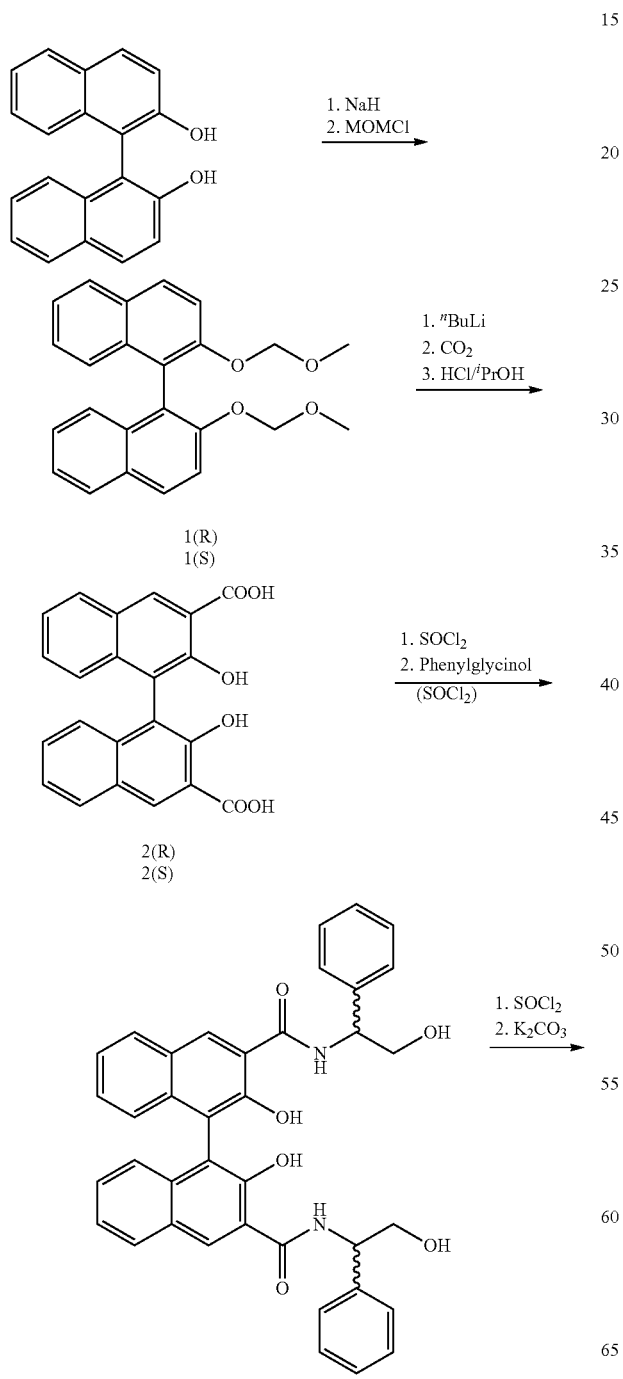

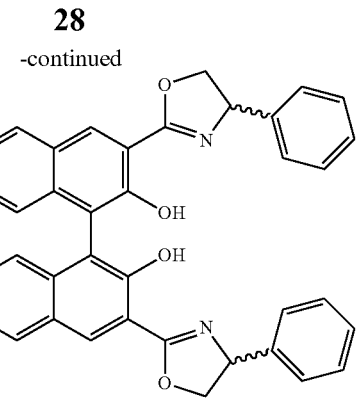

BINOL-Box

3(R)(R)
3(S)(R)
3(R)(S)
3(S)(S)

Synthesis of 2,2'-bis(methoxymethoxy)-1,1'-binaphthalene (1)

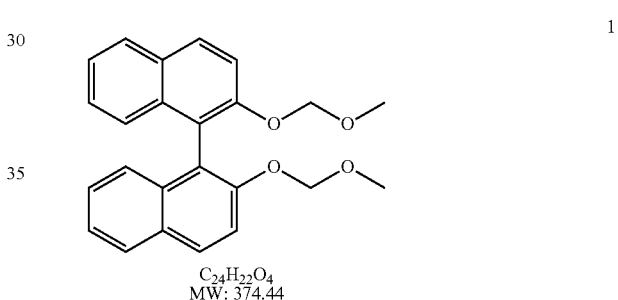

9.76 g Binaphthol (34.0 mmol, 1.0 eq.) in DMF (100 ml) were slowly added to a stirred suspension of 5.76 g NaH (60% dispersion in mineral oil, 144 mmol, 4.3 eq.) in 100 ml DMF at 0° C. under argon atmosphere. The reaction mixture was stirred at 0° C. for 30 minutes, then 10.4 mL chloromethyl methyl ether (132 mmol, 4.0 eq.) were added in one portion. The ice bath was removed after 5 minutes and again 1.6 ml MOMCl (26.3 mmol, 0.6 eq.) were added. The mixture was stirred at room temperature for 3 hours, then the reaction solution was poured into 300 ml of water. The aqueous phase was extracted with diethylether (2×400 mL) and the organic phase was washed with water (4×200 mL) and NaCO$_{3, aq.}$ (300 mL), dried over MgSO$_4$ and filtered. The solvent was removed in vacuo and the product was obtained as a colorless solid. The product was recrystallized from methanol to obtain colorless crystals.

1(R): yield: 92% (31.3 mmol, 11.7 g)

$^1$H NMR (300 MHz, CDCl$_3$, 298 K): δ (ppm)=7.98 (d, [3]J=9.0 Hz, 2H), 7.90 (d, [3]J=8.1 Hz, 2H), 7.61 (d, [3]J=9.0 Hz, 2H), 7.37 (ddd, J=8.1, 6.5, 1.5 Hz, 2H), 7.29-7.16 (m, 4H, overlapping with residual proton signal of CDCl$_3$), 5.11 (d, [2]J=6.8 Hz, 2H, CH'H''), 5.01 (d, [2]J=6.8 Hz, 2H, CH'H'), 3.17 (s, 6H, CH$_3$).

$^{13}$C NMR (75 MHz, CDCl$_3$, 298 K): δ (ppm)=152.7, 134.1, 130.0, 129.5, 127.9, 126.4, 125.6, 124.1, 121.4, 117.4, 95.3, 55.9.

| EA: | calculated | C 76.99 | H 5.92 |
| --- | --- | --- | --- |
| | found: | C 76.80 | H 5.99 |

1(S): yield: 89% (30.3 mmol, 11.3 g)
$^1$H NMR (300 MHz, CDCl$_3$, 298 K): δ (ppm)=7.97 (d, $^3$J=9.0 Hz, 2H), 7.89 (d, $^3$J=8.1 Hz, 2H), 7.60 (d, $^3$J=9.0 Hz, 2H), 7.36 (ddd, J=8.1, 6.5, 1.5 Hz, 2H), 7.29-7.15 (m, 4H, overlapping with residual proton signal of CDCl$_3$), 5.10 (d, $^2$J=6.8 Hz, 2H, CH'H''), 5.00 (d, $^2$J=6.8 Hz, 2H, CH'H''), 3.17 (s, 6H, CH$_3$).
$^{13}$C NMR (75 MHz, CDCl$_3$, 298 K): δ (ppm)=152.7, 134.1, 130.0, 129.5, 128.0, 126.4, 125.6, 124.1, 121.4, 117.4, 95.3, 55.9.

| EA: | calculated: | C 76.99 | H 5.92 |
| --- | --- | --- | --- |
| | found: | C 76.69 | H 5.91 |

Synthesis of 2,2'-dihydroxy-[1,1'-binaphthalene]-3,3'-dicarboxylic acid (2)

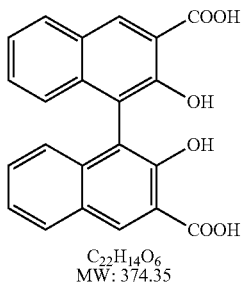

2

25.0 mL $^n$Butyllithium solution (2.5 M in hexane, 62.5 mmol, 2.6 eq.) was slowly added to a stirred solution of 9.00 g 2,2'-bis (methoxymethoxy)-1,1'-binaphthyl 1 (24.0 mmol, 1.0 eq.) in 100 mL THF at 0° C. After stirring for 2 hours at 0° C., carbon dioxide was passed into the solution with a syringe via a separate flask filled with dry ice. The reaction was quenched by addition of 100 mL water after 4 hours. The aqueous phase was washed with diethyl ether (2×50 mL) and then acidified to pH=2 with an aqueous 5% hydrogen chloride solution. The aqueous phase was then extracted with ethyl acetate (3×100 mL). The combined ethyl acetate phases were extracted with brine, dried over MgSO$_4$, filtered and the solvent was removed under vacuum.

The protection group was removed by dissolving the product in THF and cooling to 0° C. 80 mL of a 5-6 N hydrogen chloride solution in iso-propanol was added and stirred for 2 hours at room temperature. The solvent was removed under vacuum, the residue was dissolved in ethyl acetate and then washed with water (2×100 mL), dried over MgSO$_4$, filtered and the solvent was removed under vacuum. The product was washed with cold chloroform and was isolated as a yellow powder.

2(R): yield: 35% (8.49 mmol, 3.19 g)
$^1$H NMR (300 MHz, DMSO-d$_6$, 298 K): δ (ppm)=11.23 (br s, 2H), 8.75 (s, 2H), 8.10 (dd, $^3$J 30=6.3, 3.0 Hz, 2H), 7.37 (dd, $^3$J=6.3, 3.0 Hz, 4H), 7.11-6.81 (m, 2H).
$^{13}$C NMR (75 MHz, DMSO-d$_6$, 298 K): δ (ppm)=172.1, 154.1, 136.5, 132.6, 129.8, 129.3, 126.7, 124.0, 123.7, 116.3, 114.6.

2(S): yield: 46% (11.1 mmol, 4.17 g)
$^1$H NMR (300 MHz, DMSO-d$_6$, 298 K): δ (ppm)=11.25 (br s, 2H), 8.74 (s, 2H), 8.16-8.04 (m, 2H), 7.47-7.26 (m, 4H), 7.07-6.88 (m, 2H).
$^{13}$C NMR (75 MHz, DMSO-d$_6$, 298 K): δ (ppm)=172.1, 154.1, 136.5, 132.6, 129.9, 129.3, 126.7, 124.0, 123.7, 116.3, 114.7.

Synthesis of 3,3-bis(4-phenyl-4,5-dihydrooxazol-2-yl)-[1,1'-binaphtalene]-2,2'-diol (H$_2$[(Binol-Box)$^{Ph}$]

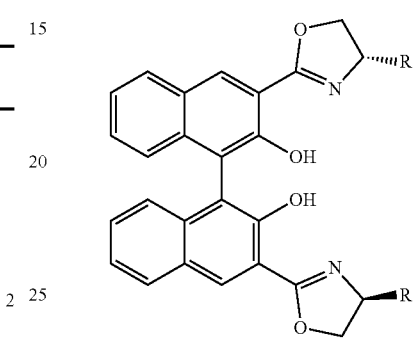

3

A solution of 7.00 g 2 (1.0 eq.) in 60 ml of thionyl chloride was refluxed for 5 h at 80° C. Afterwards, thionyl chloride was removed in vacuo and the residue was dissolved in 100 mL dichloromethane. A solution of (R)-phenylglycinol/(S)-phenylglycinol, (R)-phenylalaninol, etc. (2.2 eq.) and triethylamine (1.6 eq) in 60 ml of dichloromethane were added at 0° C. and the solution is stirred at room temperature overnight. A solution of thionyl chloride (5 eq.) in 50 ml of dichloromethane was added dropwise and stirred overnight at room temperature. The reaction was terminated by the addition of water (150 mL). The aqueous and organic phases were separated and the aqueous one was extracted with dichloromethane (3×150 mL). The organic phases were then combined, dried over magnesium sulfate, filtrated and the solvent was removed under reduced pressure. A solution of potassium carbonate (5.5 eq) in 50 ml of water was added to the residue dissolved in 50 ml of acetonitrile and refluxed overnight at 100° C. The solvent was removed and the residue was dissolved in dichloromethane (200 mL) and water (170 mL), then the organic phase was extracted with a 1.0 M hydrochloric acid solution (100 mL) and the aqueous phase with dichloromethane (100 mL). After combining the organic phases and drying over magnesium sulfate, the solvent was removed under reduced pressure. For purification, the crude product was purified via column chromatography (hexane:EtOAc=5:1, SiO$_2$) and recrystallized from ethylacetate to give a colorless to pale yellow solid.

3(S)(R)$^{Ph}$:
Yield: 31%
DC: R$^f$=0.45 ($^n$hexan:EtOAc=5.1) [UV1]
$^1$NMR (330 MHz, CDCl$_3$, 300 K) δ (ppm)=12.17 (s, 2H, OH), 8.51 (s, 2H), 7.94-7.89 (m, 2H, CH$_{arom}$), 7.36-7.24 (m, 16H, CH$_{arom}$), 5.52 (t, $^3$J=9.2.2H), 4.91 (t, $^3$J=9.2, 2H), 4.35 (t, $^3$J=9.2, 2H, CH$_2$)
$^{13}$C-NMR (500 MHz, CDCl$_3$, 300 K): δ (ppm)=165.99, 153.00, 140.91, 136.06, 130.14, 129.14, 128.65, 128.44, 127.68, 127.13, 126.41, 124.74, 123.44, 116.60, 112.58, 73.84, 68.98.

EA: Calculated: C 79.15 H 4.89 N 4.86
Measured: C 78.96 H 4.91 N 4.87

3(S)(R)$^{Bn}$:
DC: R$^r$=0.47 ("hexan:EtOAc=5.1) [UV1]
$^1$NMR (330 MHz, CDCl$^3$, 300 K) δ (ppm)=12.12 (s, 2H, OH), 8.42 (s, 2H), 7.90-7.87 (m, 2H, CH$_{arom}$), 7.31-7.19 (m, 16H, CH$_{arom}$), 4.68 (p, $^3$J=7.7 Hz, 2H, CH), 4.51 (t, $^3$J=8.9 Hz, 2H, OCH$_2$), 4.21 (t, $^3$J=8.1 Hz, 2H, CH$_2$, OCH$_2$), 3.13 (dd, $^2$J=6.3 Hz, $^3$J=13.9 Hz, 2H, ArCH$_2$), 2.81 (dd, $^2$J=6.3 Hz, $^3$J=13.9 Hz, 2H, ArCH$_2$).

$^{13}$C-NMR (500 MHz, CDCl$_3$, 300 K): δ (ppm)=165.26, 152.99, 137.38, 135.93, 129.90, 129.08, 128.95, 128.51, 128.32, 127.07, 126.50, 124.62, 123.35, 116.52, 112.70, 71.25, 66.98, 41.59.
EA: Calculated: C 79.45 H 5.33 N 4.63
Measured: C 79.49 H 5.53 N 4.50

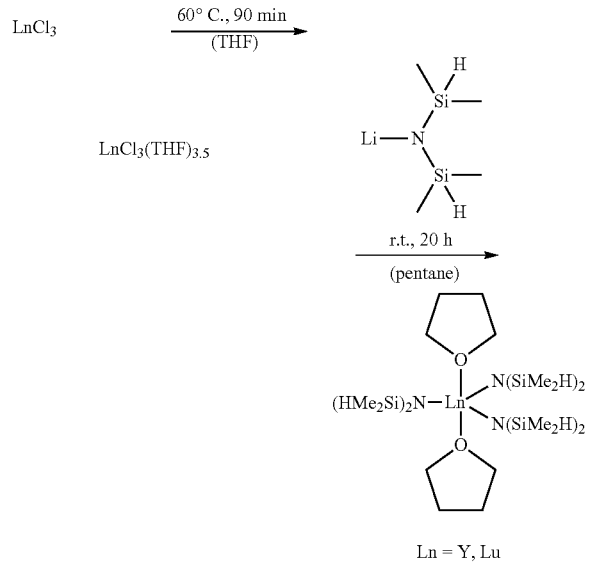

Y((SiMe$_2$H)$_2$)$_3$(THF)$_2$:
In a heated round bottom Schlenk flask a suspension of 2.20 g YCl$_3$ (11.20 mmol, 1.00 eq.) In tetrahydrofuran (120 m) is stirred for 90 min at 70° C. After solvent evaporation under vacuum the received colorless solid is suspended in pentane (100 ml) and 4.31 g lithium-bis(dimethylsilyl)amide (31.20 mmol, 2.75 eq.) are added carefully. The suspension is stirred at room temperature for 22 h. The residue is washed two times with pentane (25 ml and is subsequently recrystallized from pentane. After solvent removal and drying, 4.30 g of precursor Y(N(SiMe$_2$H)$_2$)$_3$(THF) (6.82 mmol, 61%) is obtained as colorless said.

$^1$H NMR (500 MHz, THF-d$_8$, 298 K): δ (ppm)=4.78 (hept, $^3$J=3.0 Hz, 3H, 3H, SiH), 0.10 (d, $^3$J=3.0 Hz, 18H, CH$_3$).
$^{29}$Si NMR (99 MHz, THF-d$_8$, 298 K): δ (ppm)=−23.98.
$^{13}$C NMR (126 MHz, THF-d$_8$, 298 K): δ (ppm)=45.9.
$^1$H-NMR (330 MHz, C$_6$D$_6$, 300 K): δ (ppm)=4.99 (p, $^4$J=3.0 Hz, 6H, SiH), 3.78 (s, 8H, H$_{thf}$), 1.35-1.30 (m, 8H, H$_{thf}$), 0.39 (d, $^3$J=3.0 Hz, 36H, SiMe).
$^{13}$C-NMR (500 MHz, C$_6$D$_6$, 300 K): δ (ppm)=71.0, 25.2, 3.3.
$^{29}$Si-INEPT-NMR (500 MHz, C$_6$D$_6$, 300 K): δ (ppm)=22.91.

The invention claimed is:
1. A catalyst/initiator system having the following Formula A:

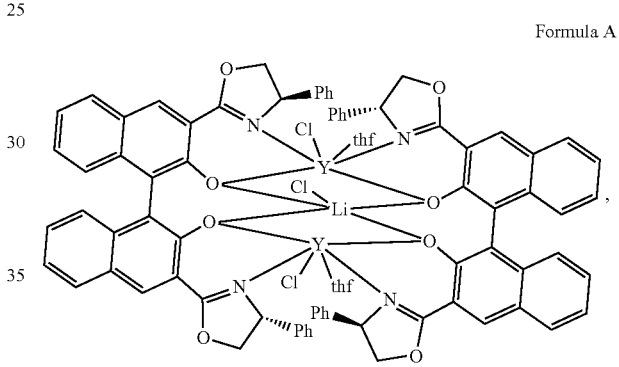

Formula A wherein the catalyst/initiator system is used for polymerizing β-butyrolactone and Y represents rare earth metal Yttrium, Ph represents Phenyl radical and thf represents tetrahydrofuran solvent ligand.

* * * * *